United States Patent
Gibbs et al.

(10) Patent No.: US 8,995,648 B1
(45) Date of Patent: Mar. 31, 2015

(54) PROCESSING AN OUTBOUND CALL CAMPAIGN HAVING MULTIPLE ABANDONMENT RATES

(71) Applicant: Noble Systems Corporation, Atlanta, GA (US)

(72) Inventors: Jeffery D. Gibbs, Atlanta, GA (US); Christopher S. Haggerty, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 25 days.

(21) Appl. No.: 13/918,294

(22) Filed: Jun. 14, 2013

(51) Int. Cl.
*H04M 3/00* (2006.01)
*H04M 3/51* (2006.01)

(52) U.S. Cl.
CPC .................................. *H04M 3/5158* (2013.01)
USPC .................. 379/266.07; 379/112.04; 379/133

(58) Field of Classification Search
CPC . H04M 3/5158; H04M 3/5238; H04M 3/527; H04M 2242/18
USPC ............. 379/265.01, 265.02, 266.07, 266.08, 379/112.01, 112.04, 133
See application file for complete search history.

(56) References Cited

U.S. PATENT DOCUMENTS

| | | | |
|---|---|---|---|
| 5,295,184 A | 3/1994 | Smith et al. | |
| 5,343,518 A | 8/1994 | Kneipp | |
| 5,570,419 A | 10/1996 | Cave et al. | |
| 5,640,445 A | 6/1997 | David | |
| 5,926,528 A | 7/1999 | David | |
| 5,963,635 A * | 10/1999 | Szlam et al. | 379/309 |
| 6,466,664 B1 | 10/2002 | Zhao | |
| 8,411,844 B1 | 4/2013 | Anisimov et al. | |
| 8,699,699 B1 * | 4/2014 | Anisimov et al. | 379/266.07 |

OTHER PUBLICATIONS

Noble Systems Corporation, Maestro 2010.1.1 User Manual, vol. 1, Aug. 17, 2010, 454 pages, Noble Systems Corporation, Atlanta GA 30319.

Noble Systems Corporation, Maestro 2010.1.1 User Manual, vol. 2, Aug. 3, 2010, 416 pages, Noble Systems Corporation, Atlanta GA 30319.

* cited by examiner

*Primary Examiner* — Antim Shah

(57) ABSTRACT

Systems and methods are disclosed for conducting an outbound call campaign that involves multiple abandonment rates. In various embodiments, one or more filters are applied to a call list for an outbound call campaign to identify a first sub-list of telephone numbers with a first applicable abandonment rate and a second sub-list of telephone numbers with a second applicable abandonment rate. In particular embodiments, the first and second sub-lists are apportioned into sets of telephone numbers and a predictive dialer places telephone calls based on a first set for the first sub-list while targeting the first abandonment rate over a first particular period of time and, after placing the first group of calls, places telephone calls based on a first set for the second sub-list while targeting the second abandonment rate over a second particular period of time.

21 Claims, 10 Drawing Sheets

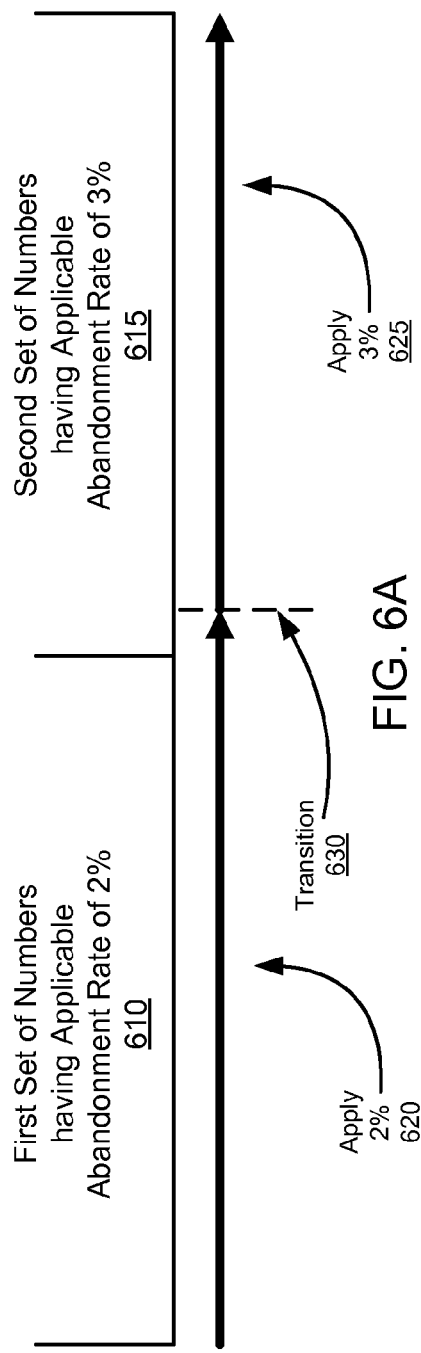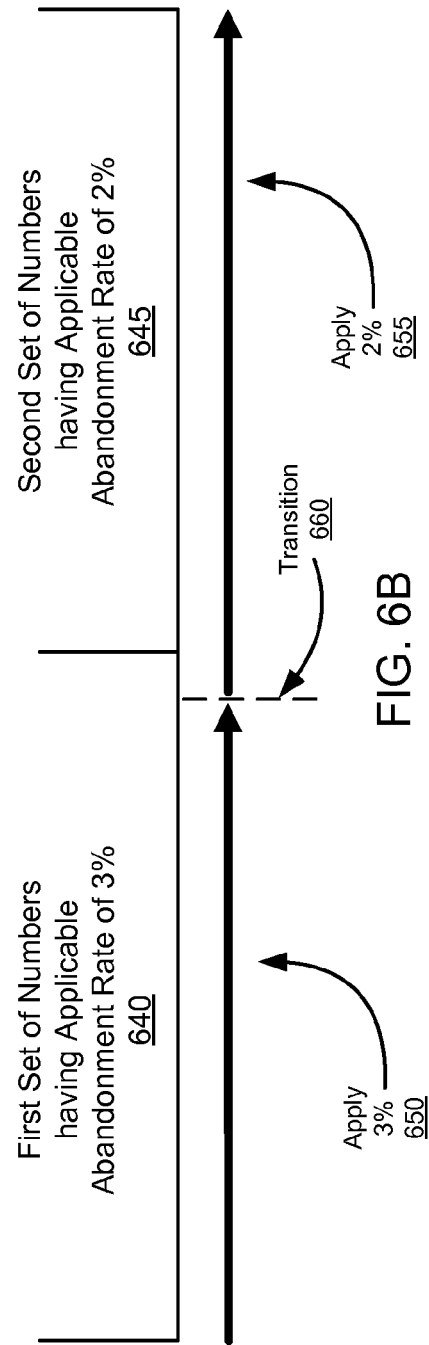

PROCESSING AN OUTBOUND CALL CAMPAIGN HAVING MULTIPLE ABANDONMENT RATES

BACKGROUND

Many contact centers employ predictive dialers to process a list of telephone numbers and originate telemarketing telephone calls for a group of agents with the goal of minimizing agents' waiting times. Typically, predictive dialers accomplish this by "dialing ahead." That is, they originate more calls than there are currently available agents based on an expectation that some calls will result in encountering a busy condition, no-answer condition, disconnected status, or being answered by an answering machine or voice mail service. In these instances, such calls do not need to be connected to an agent and hence not every call placed by the predictive dialer will need to be connected to an agent. In addition, predictive dialing is also predicated on agents completing existing calls and therefore becoming available in the near future. Thus, a predictive dialer can originate more calls than there are currently available agents and maintain the likelihood that a live person who has answered a call will be connected with minimal delay to an available agent.

In many instances, the goal of connecting answered calls with minimal delay is at odds with effectively utilizing agents. For example, multiple calls may be made without having the appropriate number of agents available, but with the expectation that agents may become available. As a result, the pool of available agents may be insufficient to immediately connect each encountered called party that has answered a call. That is, the predictive dialer may originate a call that is answered by a live called party but may not have an available agent to connect the live called party with. In such situations, the predictive dialer may terminate the call or an announcement may be played requesting the called party to wait for an agent. These situations result in what is referred to as an abandoned call and are considered annoying to many.

In response, governmental regulations have been implemented to limit the occurrence of abandoned calls for telemarketing purposes. Accordingly, a telemarketer exceeding the applicable abandonment limit (e.g., rate) can potentially receive significant fines. With that said, however, governmental regulations can vary with respect to the state to which telephone calls are placed. For example, the Federal Trade Commission ("FTC") has set a limit on how often an abandoned call can occur. The FTC requires that at least ninety-seven percent of a telemarketer's calls that are answered by a called party be connected to an agent within two seconds after the called party answers. This equates to an abandonment rate of three percent. In contrast, the state of California requires that at least ninety-nine percent of a telemarketer's calls that are answered by a called party be connected to an agent within two seconds after the called party answers. Therefore, the state of California requires a smaller abandonment rate of one percent than the FTC's three percent abandonment rate.

For contact centers conducting outbound telemarketing campaigns, there may be instances in which multiple governmental regulations apply to a particular campaign. For example, a contact center may be conducting an outbound call campaign for an insurance company and the campaign may be targeting potential customers on the West Coast of the United States. Thus, in this instance, the contact center may be placing calls to telephone numbers in states such as Oregon and Washington in which a three percent abandonment rate applies and placing calls to telephone numbers in California in which a one percent abandonment rate applies. Therefore, a need exists in the art for conducting outbound campaigns in which multiple abandonment rates apply and ensuring that the contact center complies with applicable governmental regulations with respect to the multiple abandonment rates. It is with regard to this and other aspects that the present disclosure is presented.

BRIEF SUMMARY

Technologies are generally presented herein pertaining to conducting an outbound call campaign involving multiple applicable abandonment rates. In particular, various embodiments of the invention involve accessing a call list comprising a plurality of telephone numbers for an outbound call campaign and applying one or more filters to the call list to identify a first sub-list that includes telephone numbers for which a first abandonment rate is applicable and a second sub-list that includes telephone numbers for which a second abandonment rate is applicable. For instance, in particular embodiments, the one or more filters are based on states and the first sub-list may include telephone numbers for one or more states requiring compliance with the first abandonment rate over a first particular period of time and the second sub-list may include telephone numbers for one or more states requiring compliance with the second abandonment rate over a second particular period of time. Depending on the embodiment, the first and second particular periods of time may comprise different measures such as thirty consecutive days or a total period of time over which the outbound call campaign is completed.

In particular embodiments, the first and second sub-lists may also be apportioned into sets of telephone numbers. Thus, in these particular embodiments, a predictive dialer places a first group of telephone calls based on a first set of telephone numbers for the first sub-list. In this instance, the predictive dialer originates the first group of telephone calls to target the first abandonment rate over the first particular period of time. Likewise, after placing the first group of telephone calls, the predictive dialer places a second group of telephone calls based on a first set of telephone numbers for the second sub-list. However, in this stance, the predictive dialer originates the second group of telephone calls to target the second abandonment rate over the second particular period of time. Further, depending on the embodiment, the predictive dialer may transition from targeting the first abandonment rate to targeting the second abandonment rate by continuing to target the first abandonment rate for one or more initial telephone calls from the second group of telephone calls if the first abandonment rate is less than the second abandonment or by targeting the second abandonment rate for one or more final telephone calls from the first group of telephone calls if the first abandonment rate is greater than the second abandonment rate.

Accordingly, in various embodiments, the predictive dialer may continue processing the call list by first placing a third group of telephone calls based on a second set of telephone numbers for the first sub-list. Again, the predictive dialer originates the third group of telephone calls to target the first abandonment rate over the first particular period of time. Further, after placing the third group of telephone calls, the predictive dialer continues by placing a fourth group of telephone calls based on a second set of telephone numbers for the second sub-list. Again, in this instance, the predictive dialer originates the fourth group of telephone calls to target the second abandonment rate over the second particular period of time. Thus, in these particular embodiments, the predictive dialer may alternate between sets of telephone numbers for the first and second sub-lists to process the entire call list for the outbound call campaign.

In various embodiments, one or more priority rules may be applied to prioritize the first sub-list over the second sub-list. Depending on the embodiment, these priority rules may be based on different criteria such as, for example, the abandonment rates. Further, various embodiments may involve determining whether a campaign goal has been achieved by placing the first group of telephone calls before placing the second group of telephone calls. That is, in these particular embodiments, the second group of telephone calls is placed as a result of the campaign goal not being achieved by placing the first group of telephone calls.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 6A & 6B illustrate diagrams showing transitions from placing telephone calls for a first set of telephone numbers having a first applicable abandonment rate to placing telephone calls for a second set of telephone numbers having a second applicable abandonment rate according to various embodiments of the invention.

DETAILED DESCRIPTION

Figure 1:
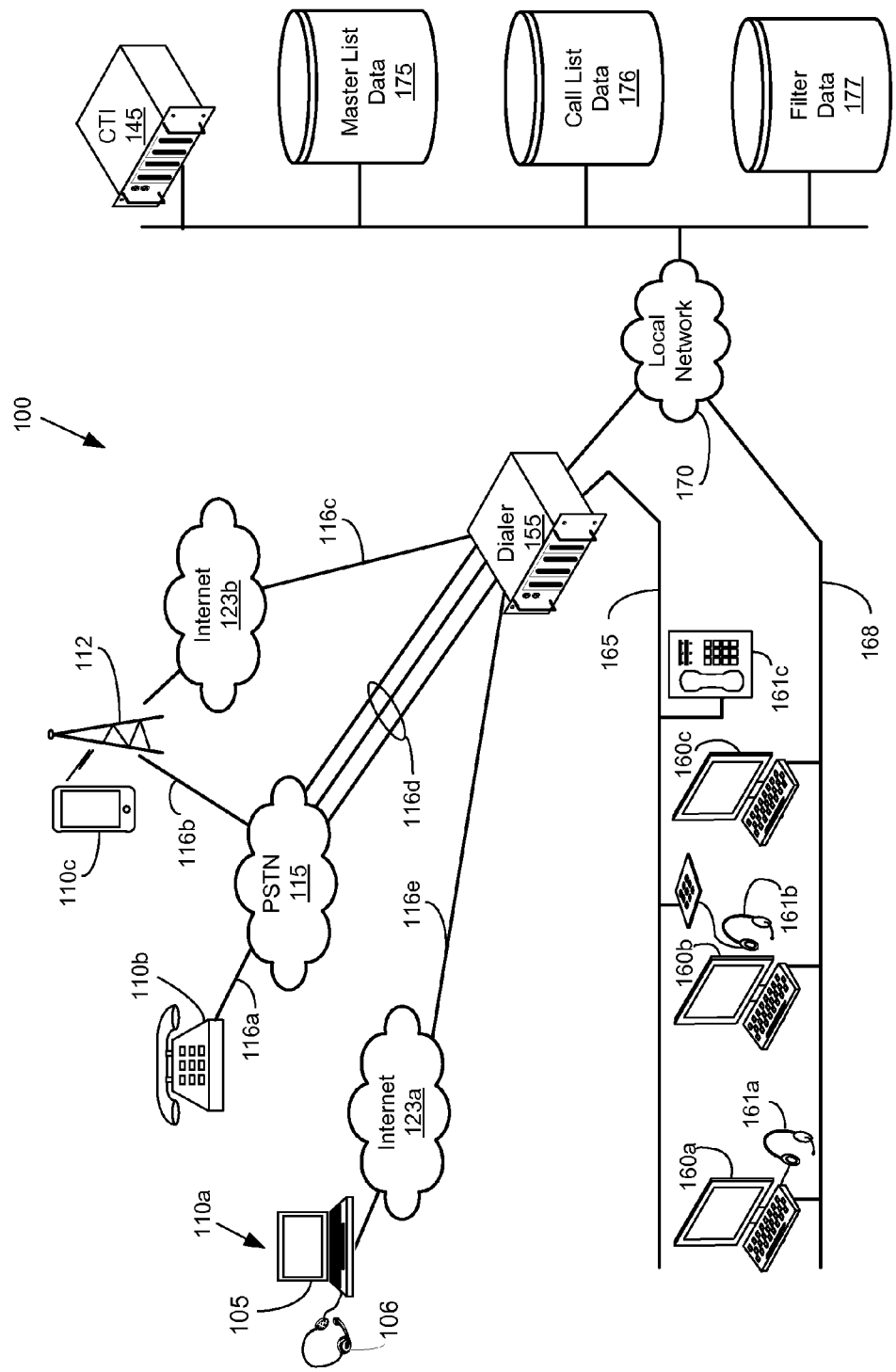
FIG. 1 shows one embodiment of a contact center architecture that may be used in accordance the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 that may be used in accordance the various technologies disclosed herein. Although many aspects of contact center operation are disclosed in the context of voice calls, the contact center may process other forms of communication such as, for example, facsimiles, emails, text messages, video calls, chat messages, and other forms. The term "party" without any further qualification refers to a live person (as opposed to an answering machine or voice mail service) associated with an instance of communication processed by the contact center.

The contact center shown in FIG. 1 may process voice calls that are originated by a dialer 155. In various embodiments, the dialer 155 is configured to dial a list of telephone numbers to initiate outbound calls. The list of telephone numbers (e.g., "call list") may be stored in some type of storage media 176 that is accessible using a local network 170. In particular instances, this call list may be assembled from telephone numbers found in a master list of telephone numbers stored in the same or a separate type of storage media 175. Further, in particular instances, the dialer 155 or some other component within the contact center architecture 100 may filter the call list into sub-lists of telephone numbers based on one or more filters stored in some type of storage media 177.

In particular embodiments, the dialer 155 may directly interface with voice trunks using facilities 116d to a public switched telephone network ("PSTN") 115 for originating calls. In these embodiments, a call may be routed by the PSTN 115 and may comprise various types of facilities, including, but not limited to: T1 trunks, SONET based fiber optic networks, ATM networks, PSTN trunks 116d, or other facilities 116e, 116c. Further, depending on the embodiment, after a call is originated and answered by a party, the dialer 155 may connect the call with an agent or place the call in a queue for a next available agent. In the latter case, announcements or music may be provided to the party as the party waits in the queue.

As discussed in further detail below, in various embodiments, the dialer 155 is a predictive dialer that makes use of one or more pacing algorithms to determine how and when to dial a group of numbers so as to minimize the likelihood of a called party being placed in a queue while maintaining effective agent utilization. That is, in particular embodiments, the dialer 155 "dials ahead" by originating more calls than there are available agents, expecting some calls not to be answered by live parties and/or more agents to become available to handle all the answered calls.

Depending on the embodiment, outbound voice calls may originate to parties using a variety of different phone types. For instance, a party may receive a call at a conventional analog telephone 110*b* connected to the PSTN 115 using an analog plain old telephone service ("POTS") line 116*a*. A party may also receive a call at a mobile device 110*c*, such as a smart phone or tablet, which wirelessly communicates with a mobile service provider ("MSP") 112. A call to a mobile device 110*c* may be routed from the PSTN 115 using an integrated services digital network ("ISDN") interface 116*b* or other types of interfaces that are well known to those skilled in the art. In addition, the MSP 112 may also route a call to a party that was received as packetized voice, referred to herein as voice-over-IP ("VoIP"), from an Internet provider 123*b* using Internet-based protocols. In turn, the call may have been routed to the Internet provider 123*b* over a trunk 116*c* from the dialer 155. For convenience, unless indicated otherwise, the term "trunk" refers to any type of facility 116*c*, 116*d*, or 116*e* providing voice calls to, or from, the contact center, regardless of the type of protocol or technology used. Specifically, a "trunk," as referred to herein, is not limited to time-division multiplexing ("TDM") technology.

Voice calls may also be received by a party employing a so-called "IP phone," "VoIP phone," or "soft phone" 110*a*. In one embodiment, this device may comprise a computing device 105, such as a laptop, desktop, or computing tablet that interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123*a*, such as a cable company providing Internet access services over a coaxial cable facility 116*e*. Those skilled in the art will recognize that a variety of protocols and facilities may be used to convey voice calls.

Once outbound calls have been answered, they may be routed over facilities 165 to agents for servicing. That is, after a call is originated by the dialer 155 and a called party answers, the call may be connected with an agent. The physical area at which the agent sits is often referred to as an agent "position" and these positions are often grouped into clusters that are managed by a supervisor, who may monitor calls and the agents' productivity. According to various embodiments, an agent typically uses a computing device, such as a computer 160*a*-160*c* and a voice device 161*a*-161*c*. In particular embodiments, data may be provided to an agent's workstation computer 160*a*-160*c* over facilities 168 along with routing the call to the agent's workstation voice device 161*a*-161*c* over other facilities 165. The combination of computer 160*a*-160*c* and voice device 161*a*-161*c* may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to a voice device 161*a*-161*c* at the agent's position. Similarly, "routing the call to the agent" means routing a call to the appropriate equipment at an agent's position.

Depending on the embodiment, the voice device used by an agent may be a soft phone device exemplified by a headset 161*a* connected to the computer 160*a*. The soft phone device may be a virtual telephone implemented in part by an application program executing in a computer. The voice device may also comprise an Internet Protocol ("IP") based headset 161*b* or a conventional phone 161*c*. Thus, use of the term "phone" is intended to encompass all these types of voice devices used by an agent.

Further, in various embodiments, a CTI server 145 may be incorporated in the contact center architecture 100 to control, monitor, and/or coordinate other components of the architecture 100. Specifically, the CTI server 145 may interact with the dialer 155 to coordinate call processing. Thus, in particular embodiments, the CTI server 145 may control routing of calls from the dialer 155 to the various agent workstations, may process telephone numbers to produce call lists and/or sub-lists of call lists, and/or may provide data to other components processing the calls. In addition, in particular embodiments, the CTI server 145 may also monitor various components of the architecture 100. For example, the CTI server 145 may monitor the number of calls made by the contact center and/or monitor performance parameters of agents such as the average handling time of calls for individual agents and/or of components such as the current abandonment rate for the dialer 155. Further, the CTI server 145 may also provide call reporting functionality based on data collected during calls.

Although the above components may be variously referred to as a "computer" "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein.

In addition, the contact center architecture 100 may be provided as a hosted solution, where the call processing functionality is provided as a communication service (a so-called "communication as a service" or "CaaS") to a contact center operator. Thus, there is no requirement that the components identified above must be actually located or controlled by a contact center operator.

In addition, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and voice devices as workstations. In some configurations, a single physical location of the contact center may not be readily identifiable. This may occur when the call processing functions are provided as a service in a hosted cloud computing environment and the agent positions are in their individual residences.

Those skilled in art will recognize FIG. 1 represents one possible configuration of a contact center architecture 100, and that variations are possible with respect to the protocols, configurations, facilities, technologies, and equipment used. Thus, other variations on the physical configurations are possible.

Call Abandonment of Telemarketing Calls

An abandoned telemarketing call typically refers to a telemarketing call that is originated by a predictive dialer 155, answered by a live called party (i.e., a person), and is not connected to an agent within a defined period of time (typically two seconds) of the called party completing his or her greeting. Some governmental regulations require that the abandonment rate of telemarketing calls does not exceed a certain percent for a given campaign and/or given time period. For example, the FTC requires that the abandonment rate does not exceed three percent for a given campaign or for a thirty day period if the campaign runs for more than thirty days. Thus, it is important that a predictive dialer 155 paces call origination so that there is a high likelihood of an agent being available to connect to an answered call so as to conform to abandonment rate requirements. In many instances, the pacing of a predictive dialer 155 typically is controlled by setting a target abandonment rate parameter.

Further, federal regulations also prohibit certain actions by the contact center that would otherwise reduce the likelihood of a call being classified as abandoned. For example, assume the predicative dialer dials two calls on behalf of a single agent and the first answered call is then connected to the agent. The second call could then be immediately terminated by the predicted dialer, thus eliminating any chance that it would be answered. However, federal regulations require that each telemarketing call be allowed to ring for at least four ring cycles or at least fifteen seconds before it can be terminated. Thus, if the first call is answered, the second call cannot be immediately terminated unless it has already exceeded the minimum ringing requirement. This requirement is intended to reduce instances in which the predictive dialer terminates the call after, for example, a single ring and the called party upon picking up the phone simply hears "dead air."

Process Overview

Figure 2:
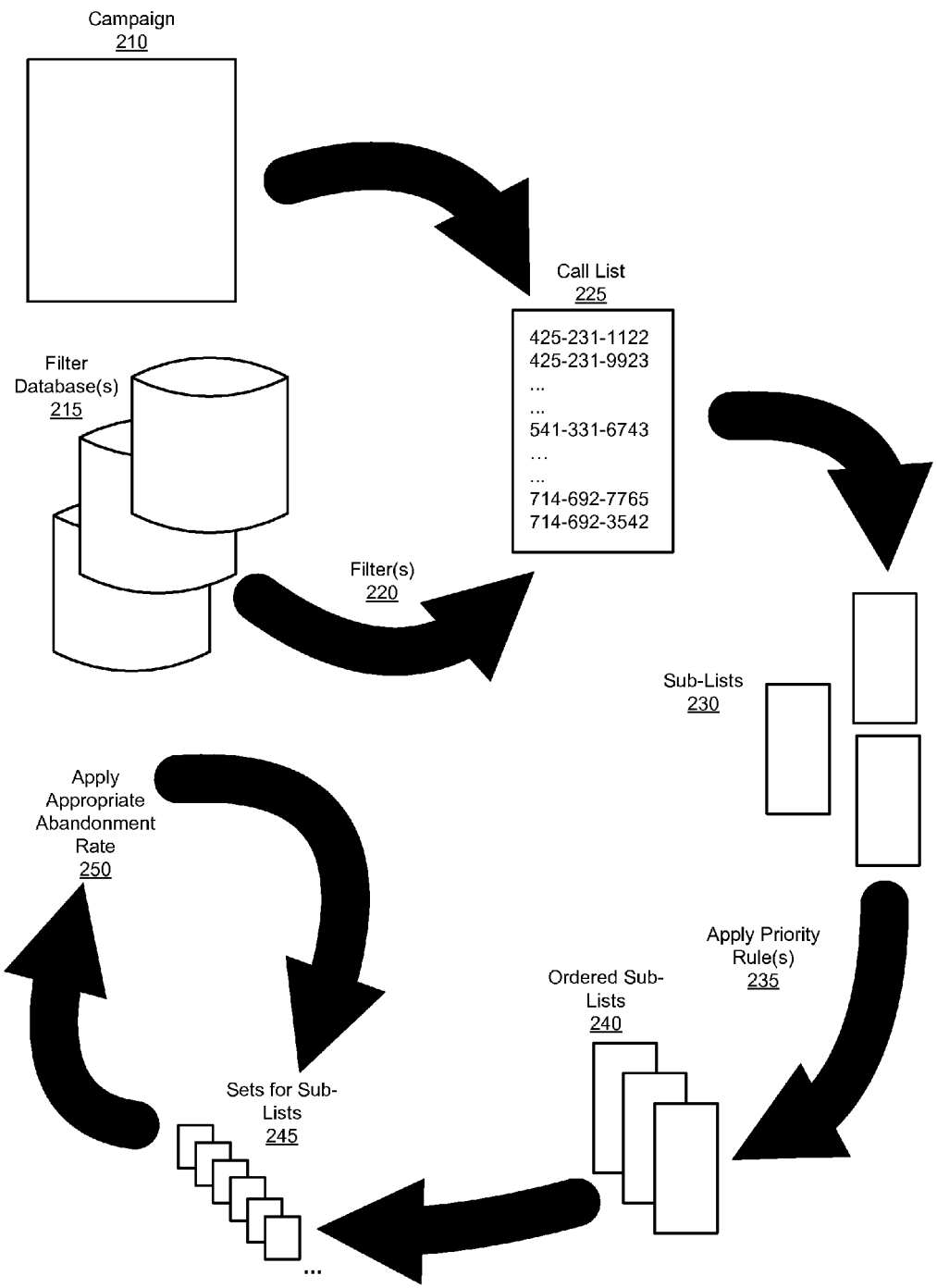
FIG. 2 illustrates a process flow for conducting an outbound call campaign having multiple applicable abandonment rates according to various embodiments of the invention.

Turning now to FIG. 2, a process flow for conducting an outbound call campaign having multiple applicable abandonment rates according to various embodiments is shown. An example is now provided to assist in explaining the process flow. This example involves a telemarketing outbound call campaign being conducted by a contact center by placing calls to states along and near the West Coast of the United States. In this example, different abandonment rates apply to the outbound calls based on the states to which the calls are placed. More specifically, calls placed to California have an applicable abandonment rate of one percent, calls placed to Washington and Oregon have an applicable abandonment rate of three percent, and calls placed to Nevada have an applicable abandonment rate of two percent.

Therefore, looking at FIG. 2, the process begins with defining one or more parameters for the outbound call campaign 210. In general, these parameters may include such information as the time period over which the outbound call campaign 210 will be conducted. For example, the parameters may indicate that the outbound call campaign 210 is to be conducted over the first week of June. In addition, the parameters may include information on one or more goals to attempt to achieve over the course of conducting the outbound call campaign 210. For example, the parameters may define a goal of making three thousand right party contacts over the course of the campaign 210 and/or achieving a particular amount of sales over the course of the campaign 210. Further, the parameters may include information used to select telephone numbers to be contacted during the campaign 210. Those of ordinary skill in the art can envision numerous parameters that may be defined for the campaign 210 in light of this disclosure.

Continuing on with the process, the contact center constructs a call list 225 for a particular time period for the outbound call campaign 210. For instance, as explained above, the outbound call campaign 210 may be scheduled for the first week of June. Thus, the contact center may construct a call list 225 to be processed on the first day of the campaign 210. Depending on the embodiment, the contact center may construct the call list 225 from a master list of telephone numbers and this master list may comprise telephone numbers that are compiled from various sources. For example, the master list may comprise known telephone numbers from the targeted states. In addition, one or more of the campaign parameters may include criteria to apply to the master list to identify the telephone numbers to include in the call list 225 for the campaign 210.

Upon completing the call list 225, the process continues with applying one or more filters 220 to the call list 225 to identify sub-lists 230 associated with different abandonment rates. In particular embodiments, these filters 220 may be defined as parameters for the campaign. However, in other embodiments, as shown in FIG. 2, these filters 220 may be queried from some storage source such as one or more databases 215. Thus, returning to the example, one or more filters 220 may be applied to the call list 225 to identify a sub-list 230 of telephone numbers from California since such numbers have an applicable abandonment rate of one percent. For instance, the filters 220 may include California zip code filters so that the California telephone numbers can be sorted out of the call list 225 into a sub-list 230. Likewise, similar types of filters 220 may be applied with respect to the other states of interest (e.g., Washington, Oregon, and Nevada). Therefore, in the example, the result of applying one or more filters 220 to the call list 225 may be a first sub-list 230 of telephone numbers from California in which an abandonment rate of one percent applies, a second sub-list 230 of telephone numbers from Washington and Oregon in which an abandonment rate of three percent applies, and a third sub-list 230 of telephone numbers from Nevada in which an abandonment rate of two percent applies.

It should be noted that depending on the embodiment, the filters 220 may also identify sub-lists 230 based on other factors besides abandonment rate. For instance, in particular embodiments, the filters 220 may also identify sub-lists 230 with respect to different areas or regions of the country such as states. Thus, in this instance, the result of applying the filters 220 may be a first sub-list 230 of numbers from California, a second sub-list 230 of number from Washington, a third sub-list 230 of numbers from Oregon, and a fourth sub-list 230 of numbers from Nevada.

Further, in particular embodiments, the sub-lists 230 may be prioritized to provide an order in which they should be processed by the predictive dialer 155. For example, if the call list 225 is separated into three different sub-lists 230 comprising a first sub-list 230 applying an abandonment rate of three percent (e.g., California numbers), a second sub-list 230 applying an abandonment rate of one percent (e.g., Washington and Oregon numbers), and a third sub-list 230 applying an abandonment rate of two percent (e.g., Nevada numbers), then one or more priority rules 235 may be applied to the sub-lists 230 to order them so that the transition from one abandonment rate to another is as smooth as possible (e.g., so that the transition maintains a high efficiency while also maintaining conformance with respect to the applicable abandonment rates). Thus, in the example, the ordered sub-lists 240 may result in an order of the 3% sub-list 230, the 2% sub-list 230, and the 1% sub-list 230.

At this point, the predictive dialer 155 processes the call list 225 for the outbound call campaign by first accessing the ordered sub-lists 240 identified for the call list 225. In particular embodiments, the predictive dialer 155 may then evaluate the ordered sub-lists 240 and apportion each sub-list into two or more sets 245. This apportionment may be performed so that numbers from each sub-list 230 may be used without having to favor a particular sub-list 230 over another. In addition, the criteria for apportioning the sub-lists 230 into sets 245 may be based on any number of different factors depending on the embodiment. For example, the predictive dialer 155 may apportion the sub-lists 230 into sets 245 based on the best times to call (e.g., the probabilities of having a right party contact (RPC)) for the individual numbers in each sub-list 230. Thus, for example, if each sub-list 230 has telephone numbers in which the morning hours are the best times to call, then the predictive dialer 155 may apportion these numbers for each sub-list 230 into a set 245 for the sub-list 230 so that the set 245 may be processed during the morning hours. In another embodiment, the predictive dialer 155 may instead (or in addition to) apportion the sub-lists 230 based on the number of telephone numbers in each sub-list 230. Further, in another embodiment, the predictive dialer 155 may instead (or in addition to) apportion the sub-lists 230 based on the capabilities of the predictive dialer 155 and its ability to process (pace) numbers at a particular abandonment rate and then switch to another abandonment rate. (It should be noted that in particular embodiments, the process of apportioning the sub-lists 230 into sets 245 may be carried out by a different component within the contact center's architecture 100 other than the predictive dialer 155. Therefore, in these embodiments, the predictive dialer 155 simply accesses the sets 245 of telephone numbers and processes them accordingly.)

Depending on the embodiment, the apportionment of the sub-list into sets can be accomplished in various ways. For instance, in one embodiment, data constructs such as pointers and/or counters are used to define sets within a sub-list and to indicate where each set begins and ends in the sub-list. While in another embodiment, separate sets may be defined by different data structures stored in a memory. Those skilled in the art will recognize that various approaches can be used for logically creating such sets.

Once the predictive dialer 155 has apportioned the sub-lists 230 into sets 245, the sets 245 have basically been identified in an order in which they are to be processed—based on the priority set for the ordered sub-lists 240. For instance, returning to the example, if the predictive dialer 155 has apportioned the 3% sub-list 230 into sets 245 of two hundred telephone numbers, the 2% sub-list 230 into sets 245 of eighty telephone numbers, and the 1% sub-list 230 into sets 245 of one hundred telephone numbers, then the sets 245 may be order as the first set 245 to be processed is a first set 245 of two hundred telephone numbers for the 3% sub-list 230, a second set 245 to be processed is a first set 245 of eighty telephone numbers for the 2% sub-list 230, a third set 245 to be processed is a first set 245 of one hundred telephone numbers for the 1% sub-list 230, a fourth set 245 to be processed is a second set 245 of two hundred telephone numbers for the 3% sub-list 230, a fifth set 245 to be processed is a second set 245 of eighty telephone numbers for the 2% sub-list 230, and so forth. Thus, the predictive dialer 155 begins by processing the first set 245 of two hundred telephone numbers for the 3% sub-list 230.

Accordingly, while the predictive dialer 155 is processing the first set 245 of two hundred telephone numbers for the 3% sub-list 230, the predictive dialer 155 paces the outbound calls to maintain a three percent abandonment rate. Likewise, while the predictive dialer 155 is processing the first set 245 of eighty telephone numbers for the 2% sub-list 230, the predictive dialer 155 paces the calls to maintain a two percent abandonment rate and so forth.

As is discussed in further detail below, depending on the embodiment, the transition between sets 245 (that is, the transition from pacing telephone numbers applicable to a first abandonment rate to pacing telephone numbers applicable to a second abandonment rate) may be carried out by the predictive dialer 155 in a number of different ways. For instance, when the predictive dialer 155 is ending one set 245 of telephone numbers applicable to a first abandonment rate and starting another set 245 of telephone numbers applicable to a second abandonment, the predictive dialer 155 may find situations in which the dialing rate is set so that the dialer 155 is batching telephone numbers applicable to the first abandonment rate along with telephone numbers applicable to the second abandonment rate. For example, the predictive dialer 155 may be currently pacing telephone calls to maintain a one percent abandonment rate and is transitioning into telephone numbers with an applicable three percent abandonment rate. As the predictive dialer 155 is batching up groups of numbers to call, at the end of the telephone numbers with an applicable one percent abandonment rate, the predictive dialer 155 may batch up a group of telephone numbers that includes numbers with a one percent applicable abandonment rate and numbers with a three percent applicable abandonment rate. At this point, the predictive dialer 155 needs to determine when to switch from pacing to maintain a one percent abandonment rate to pacing to maintain a three percent abandonment rate. In one instance, the predictive dialer 155 may be configured to determine when all of the one percent numbers have been dialed, wait a time period (e.g., fifteen seconds or four rings) to ensure all of the one percent numbers have processed/dispositioned, and then switch to a pacing rate for maintaining a three percent abandonment rate. In another instance, the predictive dialer 155 may be configured to determine when the dialer 155 has batched up a group of telephone numbers that only include numbers with a three percent applicable abandonment rate and then switch to a pacing rate for maintaining a three percent abandonment rate. While in another instance, the predictive dialer 155 may be configured to determine when all of the calls associated with a one percent abandonment rate have been dispositioned and then switch to a pacing rate for maintaining a three percent abandonment rate. The same type of processes may be performed in instances in which the predictive dialer 155 is transitioning from a higher abandonment rate (e.g., three percent) to a lower abandonment rate (e.g., one percent).

Depending on the embodiment, the predictive dialer 155 may continue to process sets 245 of the sub-lists 230 until all of the sets 245 have been completed. However, in other embodiments, the predictive dialer 155 may periodically check to see whether one or more campaign goals set for the campaign have been achieved before moving forward and processing additional sets 245 of sub-lists 230. For instance, returning to the example, the parameters for the outbound call campaign may be set so that the campaign has a goal of achieving three thousand right party contacts (RPCs) over seven days (one week). Therefore, a forecast may have been generated for the campaign that predicts a number of telephone calls that must be placed every day and a number of RPCs that must occur for the day (e.g., roughly 428) in order for the campaign to be on track to reach three thousand RPCs by the end of the week. Accordingly, a call list 225 for a particular day is generated based on the forecasting results and so forth. Thus, for this particular example, the predictive dialer 155 may check periodically during the day to determine whether the daily goal(s) have been achieved. That is, the predictive dialer 155 may check periodically during the day to determine whether four hundred and twenty-eight RPCs have been achieved. If not, the predictive dialer 155 may then continue to process additional sets 245 of telephone numbers for the sub-lists 230. The periodic checks performed by the predictive dialer 155 may be carried out at various times depending on the embodiment. For example, the predictive dialer 155 may be configured to perform a check after processing each set 245, after processing a group of sets 245 for the sub-lists 230, or at particular time intervals such as every two, three, or four hours.

Thus, the embodiment of the process flow shown in FIG. 2 allows for the processing of an outbound call campaign in which the campaign involves pacing telephone numbers at different abandonment rates. Further, the embodiment of the process flow shown in FIG. 2 allows for the processing of a campaign with different abandonment rates in which the predictive dialer 155 is only capable of operating (pacing) at a single abandonment rate at any given time.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Sub-Lists Module

Figure 3:
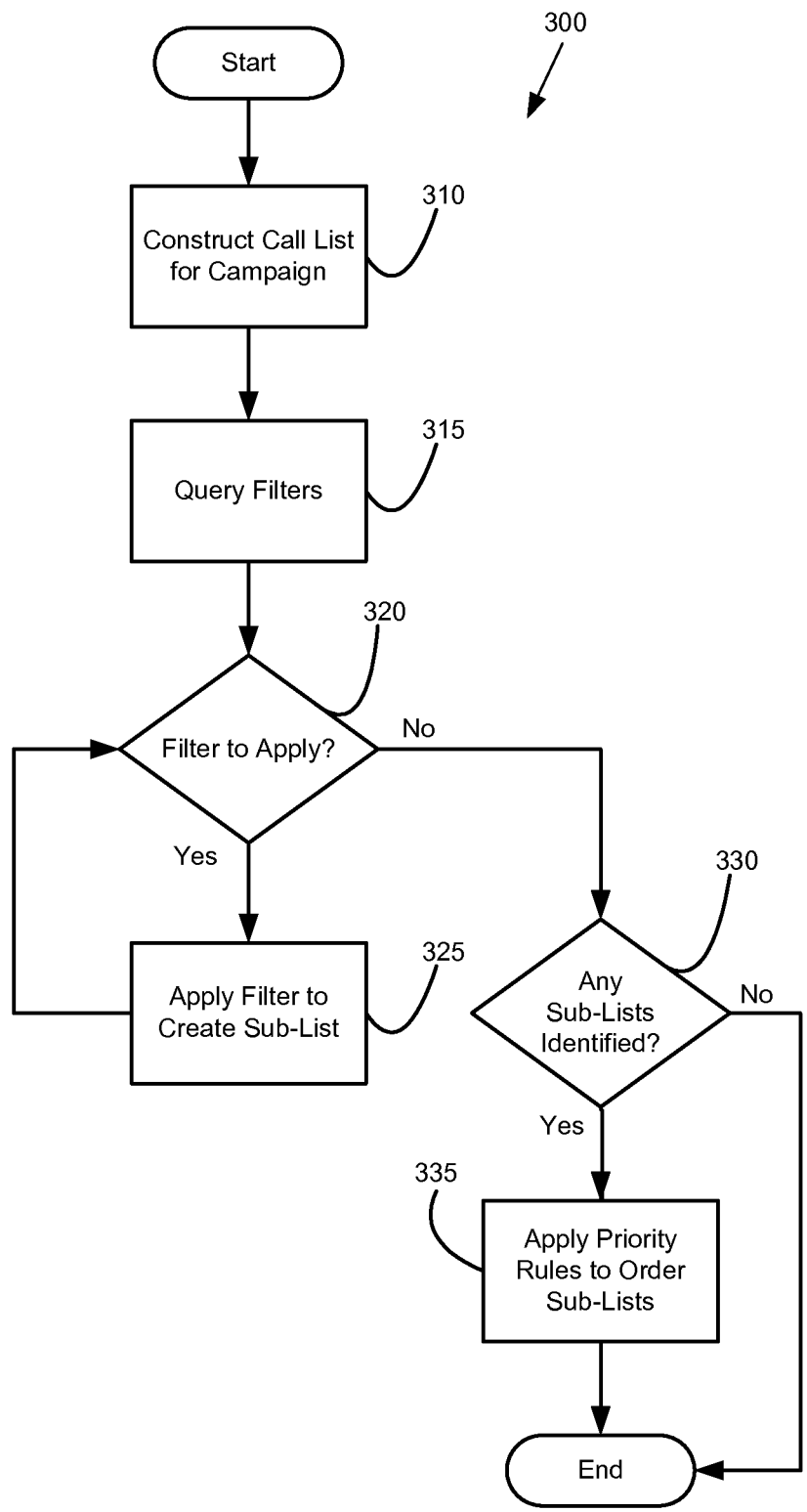
FIG. 3 illustrates a process flow for identifying sub-lists of telephone numbers for an outbound call campaign having different abandonment rates according to various embodiments of the invention.

FIG. 3 provides additional details regarding a process flow for identifying sub-lists of telephone numbers for an outbound call campaign 210 having different applicable abandonment rates according to various embodiments of the invention. As mentioned, for purposes of simplicity, the description will focus on the example detailed above involving the outbound call campaign 210 to place calls to states located on or near the West Coast of the United States. Thus, for the purposes of this example, FIG. 3 provides a flow diagram showing a sub-lists module for performing such functionality according to various embodiments of the invention. More specifically, the flow diagram shown in FIG. 3 may correspond to operations carried out by a processor of a component within the contact center's architecture 100, such the CTI server 145, as it executes the sub-lists module stored in the component's volatile and/or nonvolatile memory.

Turning now to FIG. 3, the first Operation 310 in the process 300 involves the sub-lists module constructing a call list 225 for the outbound call campaign 210. As previously mentioned, the call list 225 may be derived from a master list of telephone numbers and the call list 225 may be applicable to a particular period of time (e.g., daily). For instance, at the end of a particular day of the campaign 210, the contact center may have a call list 225 constructed to be used for the next day of the campaign 210. In addition, depending on the embodiment, the sub-lists module may apply criteria defined for the outbound call campaign 210 in constructing the call list 225. For instance, returning to the example, criteria for the outbound call campaign 210 may indicate that the sub-lists module should select telephone numbers from the states of California, Washington, Oregon, and Nevada from the master list. Further, criteria may be defined to look at the history of a particular telephone number with respect to the campaign 210. For instance, if a particular telephone number has been called during a particular day of the campaign 210 and an answering machine answered the call, then the criteria may indicate that the telephone number should be added to the next day's call list 225 so that another attempt can be made to reach the party.

Once the sub-lists module has completed constructing the call list 225, the sub-lists module queries the applicable filters 220 with respect to the outbound call campaign 210 in Operation 315. As previously mentioned, depending on the embodiment, the applicable filters 220 may be defined parameters of the campaign 210 and/or they may be more generally defined. For instance, in the example, the contact center may have filters 220 defined with respect to the various states in which outbound call campaigns may be conducted. Therefore, the sub-lists module may query one or more databases 215 to retrieve filters 220 with respect to California, Washington, Oregon, and/or Nevada. In this instance, the contact center has a filter 220 defined for California since California has an applicable abandonment rate of one percent and a filter 220 defined for Nevada since Nevada has an applicable abandonment rate of two percent. The remaining two states, Washington and Oregon, fall into a general category in which the FTC's lesser restrictive abandonment rate of three percent is applicable.

Thus, in Operation 320, the sub-lists module determines whether there is a filter 220 to apply to the particular call list 225. Since in this instance, the contact center has a filter 220 defined for California and a filter 220 defined for Nevada, the sub-lists module determines there is a filter 220 to apply to the call list 225 and applies the California filter 220 to the call list 225 in Operation 325 to create a sub-list 230 of California telephone numbers. Next, the sub-list module determines whether there is another filter 220 to apply to the call list 225. In this case, there is the Nevada filter 220 and the sub-lists module applies the Nevada filter 220 to the call list 225 to create a sub-list 230 of Nevada telephone numbers. Continuing, the sub-lists module determines there are no further filters 220 to apply to the call list 225 and the remaining telephone numbers (the Washington and Oregon telephone numbers) are considered to be a separate sub-list 230 since a different abandonment rate applies for these remaining telephone numbers.

At this point, the sub-lists module determines whether any sub-lists 230 have been identified for the call list 225 in Operation 330. If so, then the sub-lists module may apply one or more priority rules 235 to order the sub-lists in Operation 335. Depending on the embodiment, the priority rules 235 may be based on any number of different factors with respect to the contact center. For instance, in particular embodiments, the priority rules 235 may be based on the contact center's predictive dialer 155 and the dialer's capabilities. In addition, in particular embodiments, the priority rules 235 may be based on the different abandonment rates the predictive dialer 155 may be required to transition through while processing the different sub-lists 230. For example, if the predictive dialer 155 is required to transition through three different sub-lists 230 having abandonment rates of one percent, three percent, and two percent, then the contact center may have a priority rule 235 in place that states that the transition between sub-lists 230 having different abandonment rates should be ordered to provide for the minimal transition between two sub-lists 230 as possible. Thus, in this instance, the sub-lists module may order the sub-lists 230 as the 3% sub-list 230, 2% sub-list 230, and 1% sub-list 230 (or vice versa). At this point, the sub-lists module completes its processing of the call list 225 into sub-lists 230.

Predictive Dialer Module

Figure 4:
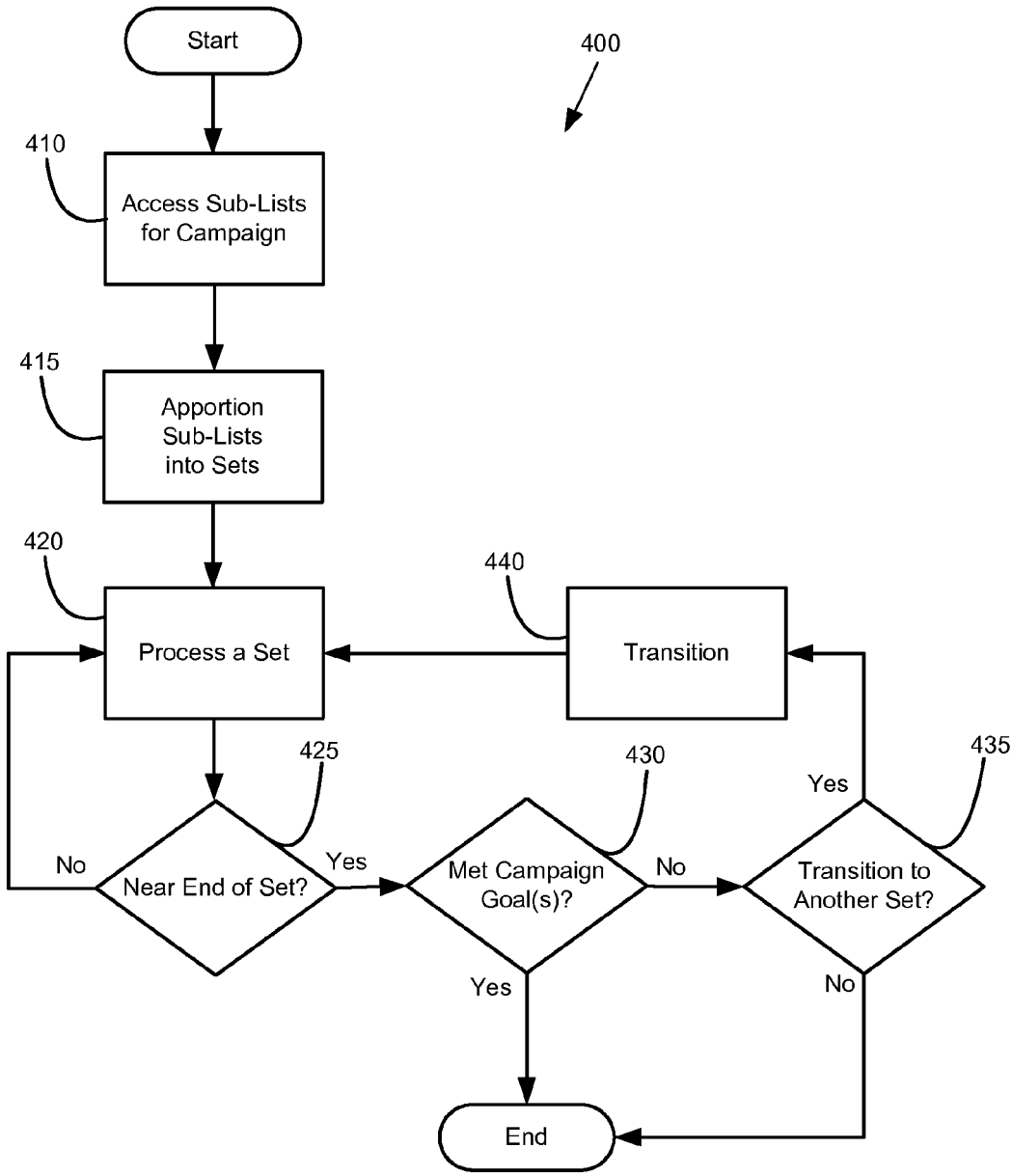
FIG. 4 illustrates a process flow for placing telephone calls based on sub-lists of telephone numbers having different applicable abandonment rates according to various embodiments of the invention.

Continuing on, the contact center's predictive dialer 155 processes the different sub-lists 230 constructed for the applicable call list 225. Accordingly, FIG. 4 provides additional details regarding a process flow for placing telephone calls based on the different sub-lists 230 having different applicable abandonment rates according to various embodiments of the invention. Specifically, FIG. 4 provides a flow diagram showing a predictive dialer module for performing such functionality according to various embodiments of the invention. Thus, the flow diagram shown in FIG. 4 may correspond to operations carried out by a processor of the predictive dialer 155 as it executes the predictive dialer module stored in the dialer's volatile and/or nonvolatile memory.

Turning now to FIG. 4, the first Operation 410 in the process 400 involves the predictive dialer module accessing the sub-lists 230 for the outbound call campaign 210. For instance, in one embodiment, the sub-lists 230 may be saved in some type of storage media located within the contact center architecture 100 and the predictive dialer module simply retrieves the different sub-lists 230 from the storage. Once the sub-lists 230 have been retrieved, the predictive dialer module evaluates the sub-lists 230 and apportions them into sets 245 in Operation 415.

Depending on the embodiment, the "apportionment" of a sub-list 230 into sets 245 may be carried out by the predictive dialer module using a number of different mechanisms. For instance, in one embodiment, the predictive dialer module may place markers (e.g., pointers) on records for telephone numbers within a sub-list 230 to indicate the various sets 245 that make up the sub-list 230. While in another embodiment, the predictive dialer module may use a counter that is used by the module to track sets 245 within a sub-list. For example, the predictive dialer module may determine that a particular sub-list 230 is to be apportioned into sets 230 of two hundred telephone numbers (e.g., records) and a counter is used to indicate the current position within the particular sub-list 230 to begin the next selection of a set 245 in the sub-list 230. While in other embodiments, the predictive dialer module may be configured to apportion sub-lists 230 into separate self-contained pieces of information for each set 245 such as, for example, one or more files, database tables, and/or records within database tables. Those of ordinary skill in the art can envision numerous mechanisms that may be used for apportioning sub-lists 230 into sets 245 in light of this disclosure.

In addition, depending on the embodiment, the predictive dialer module may apportion the sub-lists 230 based on any number of different criteria. For example, in particular embodiments, the predictive dialer module may apportion the sub-lists 230 into sets 245 based on the best times to call (e.g., the probability of having a right party contact (RPC)) for the individual numbers in each sub-list 230. For instance, the contact center may derive a best time to call a particular telephone number based on a history with respect to calling the number. In this instance, if the contact center determines the best time to call a particular telephone number based on past history and the probability of reaching the desired called party is in the evening hours between five o'clock p.m. and nine o'clock p.m., then the predictive dialer module may place this particular number is a set 245 so that the predictive dialer 155 will attempt to call this particular number during this time period. That is, the predictive dialer module may establish sets 245 that are time-dependent. Therefore, looking at the example, the predictive dialer module may construct a "morning session" set 245, an "afternoon session" set 245, and an "evening session" set 245 for each of the sub-lists 230 identified for the daily call list 225. Accordingly, as a result, during the morning session (e.g., 8:00 a.m. to 11:59 a.m.), the predictive dialer module would process the 3% sub-list's 230 "morning session" set 245, the 2% sub-list's 230 "morning session" set 245, and the 1% sub-list's 230 "morning session" set 245. Next, during the afternoon session (e.g., 12:00 p.m. to 5:00 p.m.), the predictive dialer module would process the 3% sub-list's 230 "afternoon session" set 245, the 2% sub-list's 230 "afternoon session" set 245, and the 1% sub-list's 230 "afternoon session" set 245, and so forth.

In another embodiment, the predictive dialer module may apportion the sub-lists 230 based on the number of telephone numbers in each sub-list 230. For instance, returning to the example, the predictive dialer module may determine the number of telephone numbers that exist in each of the 3%, 2%, and 1% sub-lists 230 and apportion them accordingly. For example, if the 3% sub-list 230 has three hundred telephone numbers, the 2% sub-list 230 has one hundred and eighty telephone numbers, and the 1% sub-list 230 has one hundred and fifty telephone numbers, the predictive dialer module may divide the 3% sub-list 230 into three sets 245 of one hundred telephone numbers each, the 2% sub-list 230 into three sets 245 of roughly seventy-six telephone numbers each, and the 1% sub-list 230 into three sets 245 of fifty telephone numbers.

Other criteria may be considered such as, for example, calling window requirements for the individual numbers in each sub-list 230. In addition, depending on the embodiment, the predictive dialer module may apply criteria for identifying sets 245 that involve multiple parameters to be considered by the module. For example, in one embodiment, the predictive dialer module may consider both the best time to call and the number of telephone numbers in each sub-list 230 in apportioning the sets 245 for a group of sub-lists 230. Those of ordinary skill in the art may envision other types of criteria that may be used in light of this disclosure.

Further, it is noted that in various embodiments the predictive dialer module may be configured to apportion the various sub-lists 230 into an equal number of sets 245 for each sub-list 230. For instance, in the example provided above, the predictive dialer module apportioned each sub-list 230 into three sets 245. This may have been done so that the sets 245 for each sub-list 230 can be placed into groupings together for processing by the predictive dialer 155.

With that said, however, the sub-lists 230 do not always need to be apportioned into an equal number of sets 245 for every embodiment. For instance, in one embodiment, each set 245 may be assigned a start time for processing and the predictive dialer 155 processes the sets 245 according to their associated start times. For example, a first sub-list 230 may be apportioned into three sets 245: a first set 245 starting at 9:00 a.m.; a second set 245 starting at 2:00 p.m.; and a third set 245 starting at 4:00 p.m. In addition, a second sub-list 230 may be apportioned into two sets 245: a first set 245 starting at 12:00 p.m. and a second set 245 starting at 6:00 p.m. Therefore, in this example, the predictive dialer 155 processes the sets 245 in the order of the first sub-list's 230 set 245 scheduled to start at 9:00 a.m., the second sub-list's 230 set 245 scheduled to start at 12:00 p.m., the first sub-list's 230 set 245 scheduled to start at 2:00 p.m., and so forth.

Finally, it is noted that in various embodiments telephone numbers may be added or subtracted from sets 245 as they are being processed. For example, a call may have been placed for a particular telephone number found in a first set 245 of a particular sub-list 230 and the call may have resulted in an answering machine answering the call. In this instance, the contact center may wish to attempt to contact the called party for the particular number at a different time during the day and may place the particular telephone number into a subsequent set 245 of the particular sub-list 230.

Returning now to FIG. 4, once the sub-lists 230 have been apportioned, typically an order has been established for all of the sets 245 and this order may be based on the priority established for the sub-lists 230. For instance, in the example, once the sub-lists 230 have been apportioned, the sets 245 may be ordered as the 3% sub-list's 230 "morning session" set 245, the 2% sub-list's 230 "morning session" set 245, the 1% sub-list's 230 "morning session" set 245, the 3% sub-list's 230 "afternoon session" set 245, the 2% sub-list's 230 "afternoon session" set 245, the 1% sub-list's 230 "afternoon session" set 245, and so forth.

Thus, the predictive dialer module begins to process the first set 245 for the 3% sub-list 230 and targets an abandonment rate of three percent. That is, the predictive dialer module begins to process the telephone numbers in the first set 245 by originating telephone calls for the telephone numbers at a pace to adhere to an abandonment rate of three percent in Operation 420. Depending on the embodiment, the predictive dialer module may use any number of different pacing algorithms to maintain a conformance to a three percent abandonment rate as known by those of ordinary skill in the art.

At this point, the predictive dialer module periodically determines whether the end of the current set 245 is near in Operation 425. That is, the predictive dialer module periodically determines whether it is getting near the end of processing the telephone numbers in the current set 245 and transitioning into processing telephone numbers in the next set 245. For example, in one embodiment, the predictive dialer module is configured to detect when a particular number of telephone numbers (e.g., twenty) are left to call in the current set 245.

If the determination is no, the predictive dialer module continues to process the telephone numbers in the current set 245. However, if the determination is yes, for the embodiment shown in FIG. 4, the predictive dialer module determines whether one or more campaign goals for the outbound call campaign 210 have been met with respect to the call list 225 constructed for the applicable time period in Operation 430. Thus, returning to the example, the outbound call campaign 210 may have a daily goal of achieving three hundred RPCs. Therefore, as the predictive dialer module nears completing processing the telephone numbers in a set 245 for a particular sub-list 230, the predictive dialer module determines whether three hundred RPCs have been achieved with respect to the calls already placed for the day in the outbound call campaign 210. If so, then the predictive dialer module ends processing any more of the daily call list 220 for the outbound call campaign 210.

However, if the daily goal of three hundred RPCs has not been met, then the predictive dialer module determines whether a transition to another set 245 is to occur in Operation 435. Therefore, the predictive dialer module determines whether another set 245 exists with respect to the apportionment performed in Operation 415. If the determination is no, then the predictive dialer module simply ends processing.

Returning to Operation 435, if instead the predictive dialer module determines a transition to another set 245 is to occur, then the predictive dialer module transitions to the new applicable abandonment rate in Operation 440 for the next set 245. That is, returning to the example, if the predictive dialer module determines at the end of processing the first set 245 for the 3% sub-list 230 that a transition is to occur to the first set 245 for the 2% sub-list, the predictive dialer module transitions from targeting an abandonment rate of three percent to targeting an abandonment rate of two percent. Ideally, this transition occurs as the predictive dialer module finishes processing the telephone numbers with the applicable abandonment rate of three percent and begins processing the telephone numbers with the applicable abandonment rate of two percent. However, as discussed further below, in particular embodiments, this transition may result in processing a few of the telephone numbers with the applicable abandonment rate of three percent with a target abandonment rate of two percent. This may be done to ensure that the telephone numbers with the applicable abandonment rate of two percent are processed using a target abandonment rate of two percent.

Thus, once the transition has occurred from processing the set 245 of telephone numbers with an applicable abandonment rate of three percent to the set 245 of telephone numbers with an applicable abandonment rate of two percent, the predictive dialer module continues with processing all of the telephone numbers from the set 245 of telephone numbers with an applicable abandonment rate of two percent while targeting the two percent abandonment rate. At this point, depending on the embodiment, the process 400 continues until the predictive dialer module has process all of the telephone numbers for each of the sub-lists 225 for the outbound call campaign 210 or until the one or more call campaign goals set for the time period in which the sub-lists 225 are to be processed have been achieved.

Figure 5:
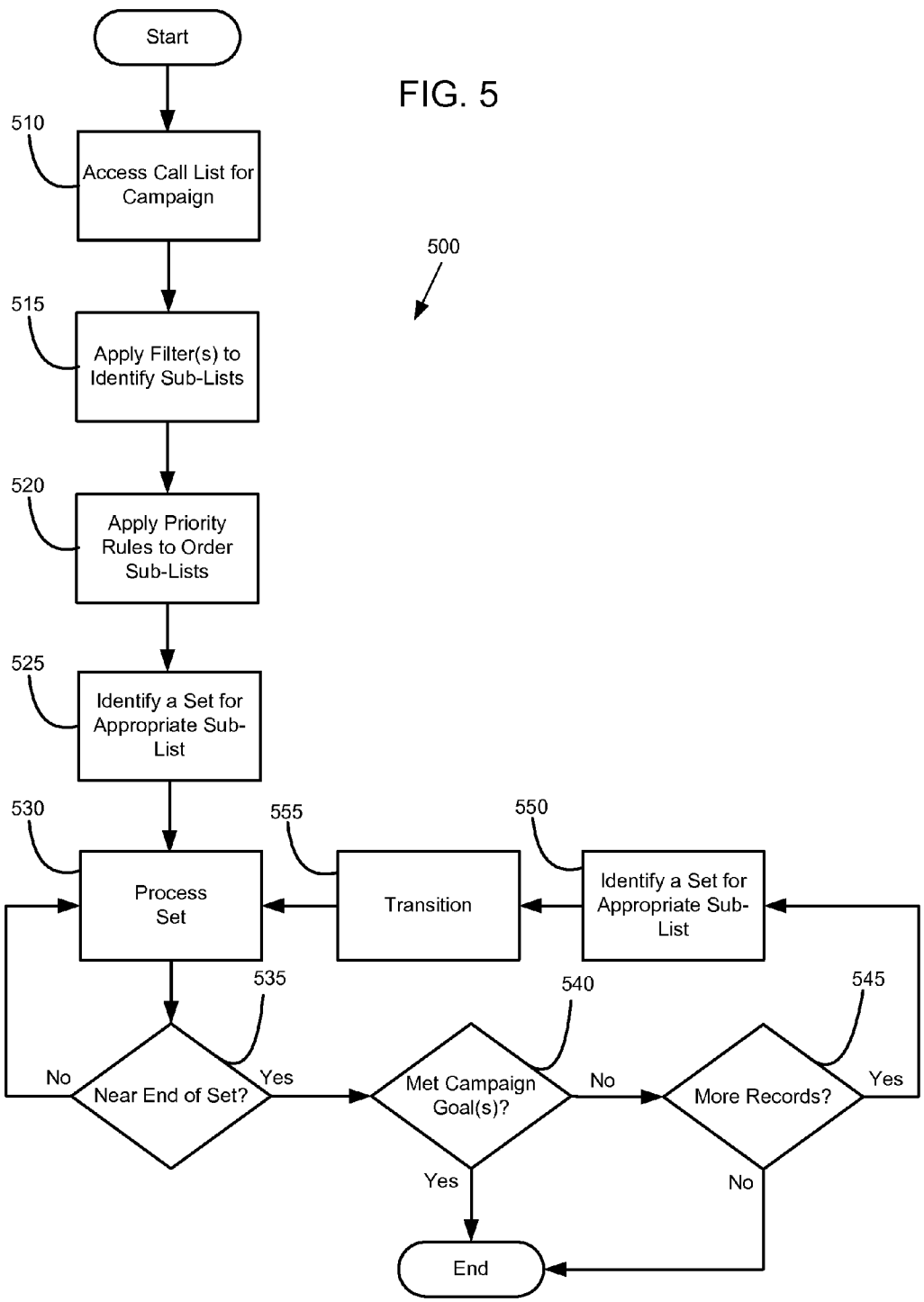
FIG. 5 illustrates another process flow for placing telephone calls based on sub-lists of telephone numbers having different abandonment rates according to various embodiments of the invention.

Turning now to FIG. 5, this figure provides a process flow in which the predictive dialer module is configured to identify the sub-lists 230 for the applicable call list 225 instead of having another component of the contact center architecture 100 identify the sub-lists 230 beforehand. Thus, for this embodiment, the predictive dialer module begins the process 500 by accessing the call list 225 for the outbound call campaign 210 in Operation 510 and then applying the filter(s) 220 in Operation 515 to identify the sub-lists 230 for the call list 225. These operations are generally carried out in the same manner as described above with respect to the process flows in FIGS. 3 and 4. Likewise, in Operation 520, the predictive dialer module applies any appropriate priority rules 235 to order the identified sub-lists 230 in a similar fashion as described above with respect to FIG. 4.

With that said, in this embodiment, a difference exists with respect to the process flow shown in FIG. 4 in that once the predictive dialer module has identified the sub-lists 230 (and prioritized the sub-lists if applicable), the predictive dialer module identifies a single set 245 of telephone numbers for the first sub-list 230 and processes this set 245 before identifying a set 245 of telephone numbers for the next sub-list 230 in the order. Thus, looking at FIG. 5, in Operation 525, the predictive dialer module identifies a set 245 of telephone numbers for the first ordered sub-list 240 for the call list 225. Therefore, returning to the example, the predictive dialer module identifies a set 245 of telephone numbers for the 3% sub-list 230. As previously mentioned, depending on the embodiment, the predictive dialer module may apply any number of different criteria in identifying the set 245 of telephone numbers. In addition, in particular instances, the predictive dialer module may also consider the outcome of any previous sets 245 of telephone numbers that have already been processed. For example, if the predictive dialer module is identifying a second set 245 of telephone numbers for the 3% sub-list 230, then the predictive dialer module may consider the results with respect to the first set 225 of telephone number for the 3% sub-list 230. For instance, if a call was placed for a telephone number in the first set 245 for the 3% sub-list 230 that resulted in reaching an answering machine, then the predictive dialer module may place the telephone number back in a subsequent (e.g., the second) set 245 for the 3% sub-list 230 so that the contact center can try again to reach the party associated with the telephone number. While in another example, the predictive dialer module may select the amount of telephone numbers to place in a set 245 based on the results of the previously processed sets 245 in achieving one or more goals established for the outbound call campaign 210.

Once the predictive dialer module has identified the set 245 of telephone numbers for the appropriate sub-list 230, the predictive dialer module processes the set 245 accordingly, in Operation 530. That is, the predictive dialer module processes the telephone numbers in the set 245 by pacing calls for the telephone numbers to maintain the target abandonment rate. Similar to the process flow discussed in FIG. 4, the predictive dialer module periodically determines whether it is nearing the end of the current set 245 of telephone numbers to process in Operation 535. If so, in particular embodiments, the predictive dialer module determines in Operation 540 whether the campaign goal(s) established for the outbound call campaign 210 have been achieved before moving on to process another set 245 of telephone numbers for the sub-lists 230. Therefore, if the campaign goal(s) have not been met, the predictive dialer module determines whether any more telephone numbers (records) exist for the identified sub-lists 230 in Operation 545. If so, in Operation 550, the predictive dialer module identifies a next set 245 of telephone numbers for the next sub-list 230 in the ordered sub-lists 240, transitions to the next applicable abandonment rate in Operation 555, and processes the set 245 accordingly. The predictive dialer module may then repeat this process 500 until the goal(s) have been met (or the dialer module runs out of telephone numbers to process from the identified sub-lists 230).

Accordingly, as the predictive dialer module processes a set 245 of telephone numbers for a particular sub-list 230, the predictive dialer module paces calls to maintain conformance to the applicable abandonment rate for the sub-list 230. Again, in this embodiment, the predictive dialer module is configured to transition the target abandonment rate when going from processing a first set 245 of telephone numbers at one abandonment rate to a second set 245 of telephone numbers at another abandonment rate.

It should be noted that the process flows shown in FIGS. 4 and 5 and described above are but two embodiments of such flows and that other embodiments of process flows for placing telephone calls based on sub-lists 230 of telephone numbers having different abandonment rates are contemplated. For example, the process flow shown in FIG. 4 may be altered to resemble the process flow shown in FIG. 5 wherein the predictive dialer module only identifies a set 245 for a particular sub-list 230 and processes the set 245 individually before the module identifies another set 245 to process. Likewise, the process flow shown in FIG. 5 may be altered to resemble the process flow shown in FIG. 4 wherein the predictive dialer module first apportions the identified sub-lists 230 into sets 245 before selecting groups of sets 245 for each sub-list 230 and processing them accordingly.

Transitioning

Turning now to FIGS. 6A and 6B, these figures illustrate transitioning from placing telephone calls for a first set 245 of telephone numbers having a first applicable abandonment rate to placing telephone calls for a second set 245 of telephone numbers having a second applicable abandonment rate according to various embodiments. Specifically, FIG. 6A illustrates a transition from a set 245 of telephone numbers having an applicable abandonment rate of two percent 610 to a set 245 of telephone numbers having an applicable abandonment rate of three percent 615. That is, in this instance, the predictive dialer module is transitioning from a set 245 of telephone numbers having a lower applicable abandonment rate to a set 245 of telephone numbers having a higher applicable abandonment rate.

Thus, in this instance, the predictive dialer module applies a target abandonment rate of two percent 620 during the time period in which the module is processing the set 245 of telephone numbers having an applicable abandonment rate of two percent 610 and also during a portion of the time period in which the module is processing the set 245 of telephone numbers having an applicable abandonment rate of three percent 615. The predictive dialer module does this to ensure that all of the telephone numbers in the set 245 having the applicable abandonment rate of two percent 610 have been completely processed by the predictive dialer module before transitioning to a target abandonment rate of three percent. In other words, the predictive dialer module maintains applying the target abandonment rate of two percent 615 to ensure that each of the telephone numbers in the set 245 having the applicable abandonment rate of two percent 610 are actually processed using a target abandonment rate of two percent.

Further, since the predictive dialer module is transitioning from a set 245 of telephone numbers having a lower applicable abandonment rate to a set 245 of telephone numbers having a higher applicable abandonment rate, applying the target abandonment rate of two percent while processing a portion of the set 245 of telephone numbers having an applicable abandonment rate of three percent 615 is acceptable because processing these telephone numbers targeting a lower abandonment rate than required ensures that the applicable abandonment rate of three percent is not exceeded. Once the predictive dialer module has completed processing all of the telephone numbers in the set 245 having an applicable abandonment rate of two percent 610, the predictive dialer module can then safely transition 630 to applying a target abandonment rate of three percent 625. In this instance, this residual time period is limited to a maximum of fifteen seconds (or four ring cycles) since the very last number originated at the two percent target rate will be dispositioned no later than fifteen seconds after being originated (e.g., the call will be answered or have reached an unanswered state and thereby can be terminated).

In contrast, FIG. 6B illustrates a situation in which the predictive dialer module is transitioning from processing a set 245 of telephone numbers having a higher applicable abandonment rate (three percent 640) to a set 245 of telephone numbers having a lower applicable abandonment rate (two percent 645). Therefore, in this instance, the predictive dialer module maintains a target abandonment rate of three percent 650 for a majority of the time period the module is processing the first set 245 of telephone numbers having an applicable abandonment rate of three percent 640 and then transitions 660 into applying a target abandonment rate of two percent 655 for a remaining portion of the time period the module is processing the first set 245 of telephone numbers having an applicable abandonment rate of three percent 640. Similar to above, the predictive dialer module does this to ensure that once the module begins to process telephone numbers in the set 245 of telephone numbers having an applicable abandonment rate of two percent, these telephone numbers are actually processed using a target abandonment rate of two percent. In other embodiments, once the first number is originated having a two percent abandonment rate, then the two percent rate is applied to all subsequent initiated calls, including any that have a three percent abandonment rate.

Figure 7:
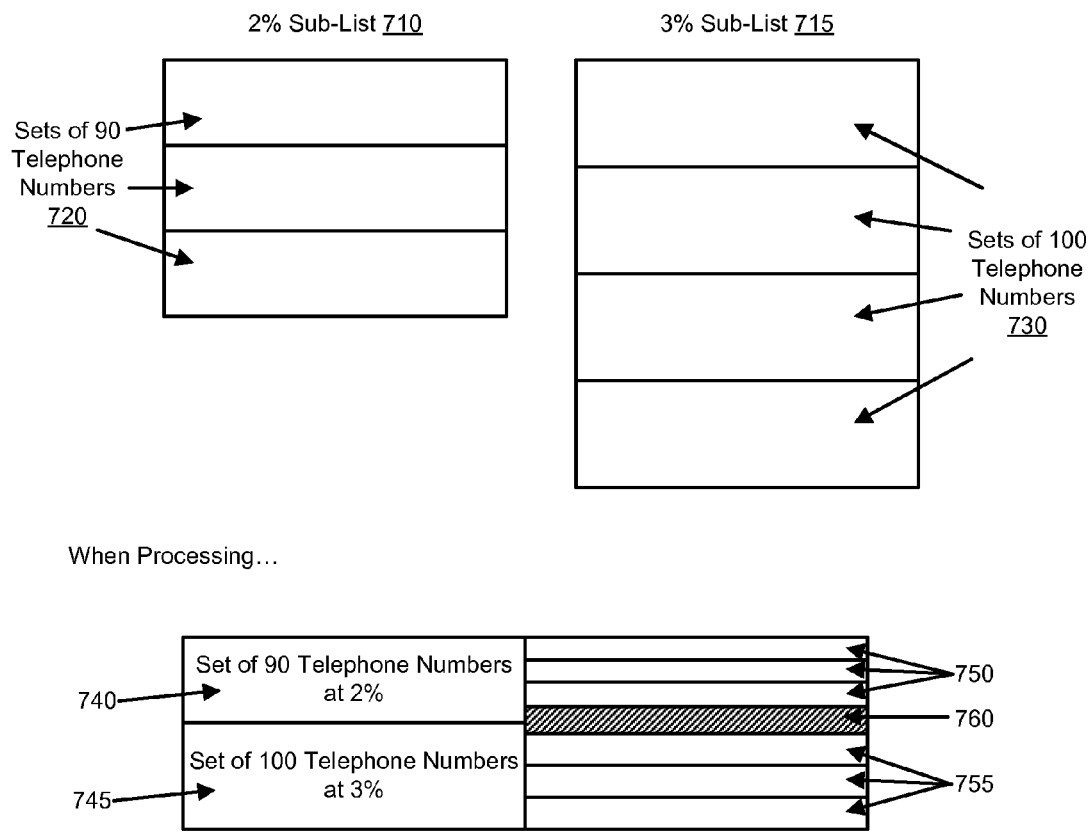
FIG. 7 illustrates batching telephone numbers involved in a transition from a set of telephone numbers having a first applicable abandonment rate to a set of telephone numbers having a second applicable abandonment rate.

To demonstrate this further, FIG. 7 illustrates batching telephone numbers involved in a transition from a set of telephone numbers have a first applicable abandonment rate to a set of telephone numbers having a second applicable abandonment rate. The figure shows a 2% sub-list 710 that has been apportioned into three sets 720 of ninety telephone numbers and a 3% sub-list 715 that has been apportioned into four sets 730 of one hundred telephone numbers.

Thus, during the time the predictive dialer module is processing the telephone numbers in one 740 of the sets of ninety telephone numbers for the 2% sub-list 710, the predictive dialer module paces the placing of telephone calls for the ninety telephone numbers so as to maintain an abandonment rate of two percent. Accordingly, based on the pacing algorithm being used by the predictive dialer module, the module batches up three groups 750 of twenty-five telephone numbers, one at a time and places calls for these numbers. That is, the predictive dialer module batches up a first group of twenty-five telephone numbers and places calls at the same time for the telephone numbers in this group, batches up a second group of twenty-five telephone numbers and places calls at the same time for the telephone numbers in this group, and batches up a third group of twenty-five telephone numbers and places calls at the same time for the telephone numbers in this group. This is done to maintain an abandonment rate of two percent while placing calls for these telephone numbers.

As a result of batching the three groups 750 of twenty-five telephone numbers, fifteen telephone numbers are left to process for the set 740 of ninety telephone numbers. Since the predictive dialer module is batching groups of twenty-five telephone numbers to maintain an abandonment rate of two percent, the module selects ten telephone numbers from a set 745 of one hundred telephone numbers having an applicable abandonment rate of three percent and places calls for this mixed group 760 of telephone numbers that includes both numbers from the set 740 of ninety telephone numbers having an applicable abandonment rate of two percent and the set 745 of one hundred telephone numbers having an applicable abandonment rate of three percent. Thus, as a result, the predictive dialer module places calls for the ten telephone numbers from the set 745 of one hundred telephone numbers having an applicable abandonment rate of three percent while still maintaining a target abandonment rate of two percent.

Once the predictive dialer module has finished processing the calls for these twenty-five telephone numbers in the mixed group 760, the module transitions to a target abandonment rate of three percent. At this point, the predictive dialer module determines that it can batch up thirty telephone numbers at a time and maintain an abandonment rate of three percent. Thus, the predictive dialer module processes groups 755 of thirty telephone numbers with respect to the remaining ninety telephone numbers left in the set 745 of one hundred telephone numbers having an applicable abandonment rate of three percent.

Figure 8:
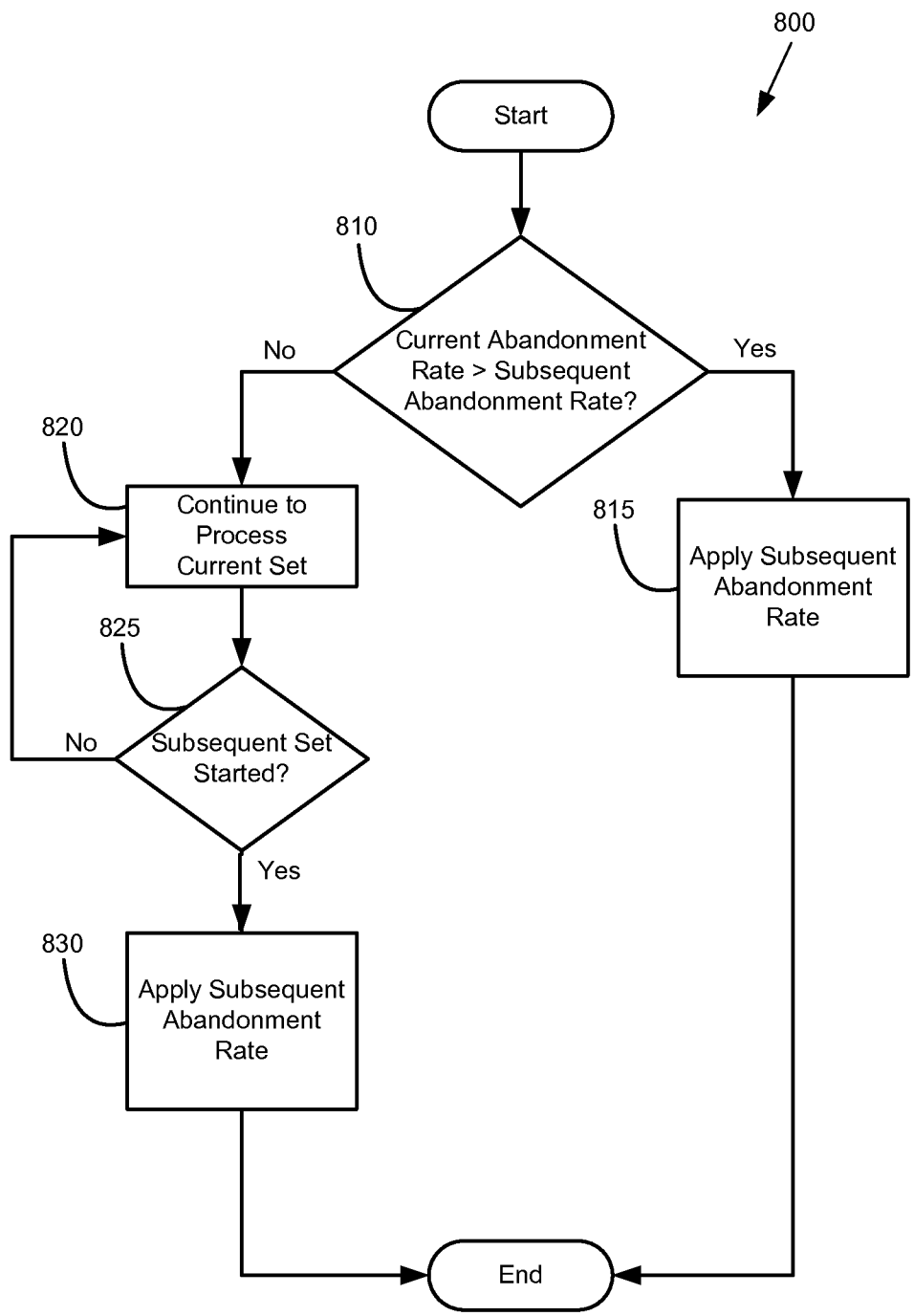
FIG. 8 illustrates a process flow for transitioning from targeting a first abandonment rate to targeting a second abandonment rate according to various embodiments of the invention.

With this example in mind and turning now to FIG. 8, this figure provides a process flow for transitioning from targeting a first abandonment rate to targeting a second abandonment rate according to various embodiments. In this instance, the predictive dialer module has determined that it is approaching the end of a set 245 of telephone numbers having the first applicable abandonment rate and is transitioning to a set 245 of telephone numbers having the second applicable abandonment rate. That is, the predictive dialer module has determined that it is about to batch a mixed group of telephone numbers to place calls in which the mixed group of telephone numbers includes both telephone number(s) having an applicable abandonment rate of three percent and telephone number(s) having an applicable abandonment rate of two percent.

Thus, the process 800 begins with the predictive dialer module determining whether the current target abandonment rate (e.g., the first abandonment rate) is greater than the subsequent target abandonment rate (e.g., the second abandonment rate) in Operation 810. Therefore, if the first abandonment rate is three percent and the second abandonment rate is two percent, then the predictive dialer module applies the subsequent abandonment rate by changing the target abandonment rate from three percent to two percent in Operation 815. By performing this operation, the predictive dialer module applies the lower target abandonment rate during the transition to ensure that compliance is maintained.

However, if instead the first abandonment rate is two percent and the second abandonment rate is three percent, then the predictive dialer module continues to process the telephone numbers using the current abandonment rate in Operation 820. Accordingly, as a result, the predictive dialer module processes all of the telephone numbers in the mixed group while maintaining a target abandonment rate of two percent. Once the predictive dialer module determines the subsequent set 245 of telephone numbers having the second applicable abandonment rate has started in Operation 825, the module then applies the subsequent abandonment rate in Operation 830. That is once the predictive dialer module has determined that all of the telephone numbers in the mixed group have been processed, the module then transitions to a target abandonment rate of three percent. Therefore, in this instance, the predictive dialer module ensures that the lower target abandonment rate is maintained during the transition when the module is processing the telephone numbers in the mixed group.

Thus, for the embodiment shown in FIG. 8, the predictive dialer module applies the lower target abandonment rate when transitioning from sets having different rates. If the transition is from a lower rate to a higher rate, the lower rate is maintained for all calls until the last of the calls having the lower rate are processed. If the transition is from a higher rate to a lower rate, the lower rate is used for all calls once the first number having the lower rate is processed.

Alternative Predictive Dialer Module

Figure 9:
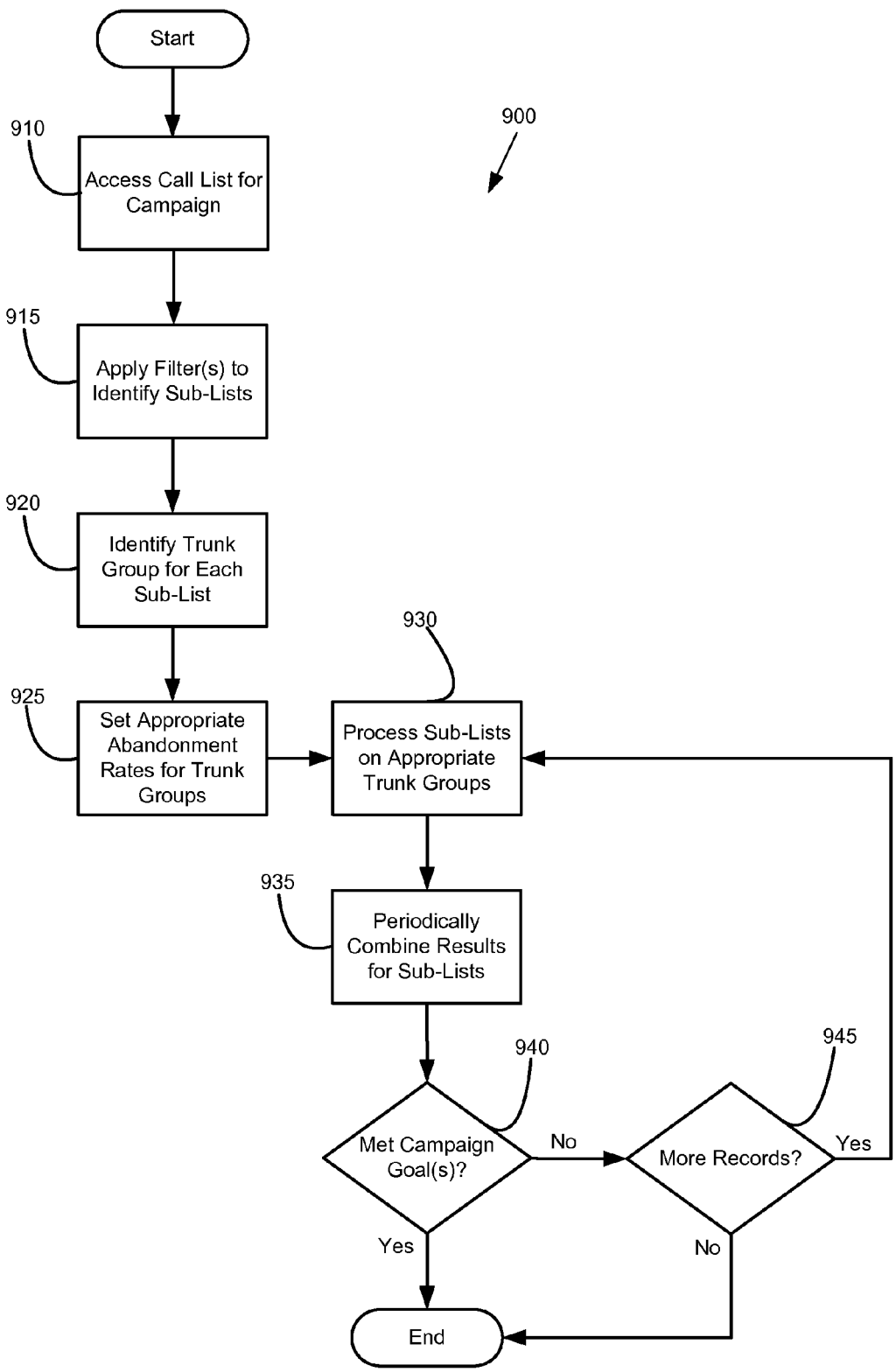
FIG. 9 illustrates another process flow for placing telephone calls based on sub-lists of telephone numbers having different abandonment rates according to various embodiments of the invention.

FIG. 9 provides an alternative process flow for placing telephone calls based on sub-lists of telephone numbers having different abandonment rates according to various embodiments of the invention. Specifically, FIG. 9 provides a flow diagram showing an alternative embodiment of the predictive dialer module for performing such functionality in according to various embodiments of the invention. Again, for purposes of simplicity, the description will focus on the example detailed above involving the outbound call campaign 210 to place calls to states located on or near the West Coast of the United States.

For this particular embodiment, the predictive dialer module has the capability to apportion the trunks into trunk groups used in processing the call list 225 between the applicable abandonment rates. Turning now to FIG. 9, the first Operation 910 in the process 900 involves the predictive dialer module accessing the call list 225 for the outbound call campaign 210. In turn, the predictive dialer module applies one or more filters 220 to the call list 225 to identify sub-lists 230 in Operation 915. Accordingly, these two operations are carried out in a similar fashion as previously described above. Thus, returning to the example, the predictive dialer module accesses the call list 225, applies the filters 220, and identifies a first sub-list 230 of telephone numbers from California in which an abandonment rate of one percent applies, a second sub-list 230 of telephone numbers from Washington and Oregon in which an abandonment rate of three percent applies, and a third sub-list 230 of telephone numbers from Nevada in which an abandonment rate of two percent applies.

At this point, the predictive dialer module identifies a trunk group for each of the applicable abandonment rates used in the outbound call campaign in Operation 920. That is, the predictive dialer module identifies a trunk group for each of the identified sub-lists 230 for the call list 230. Depending on the embodiment, this operation may be carried out in a number of different ways by the predictive dialer module. For instance, in one embodiment, the predictive dialer module may apportion the available trunks for each sub-list 230 based on the amount of telephone numbers comprising each sub-list 230. For example, the 3% sub-list 230 may have three hundred telephone numbers, the 2% sub-list 230 may have one hundred and eighty telephone numbers, and the 1% sub-list 230 may have one hundred and fifty telephone numbers. Therefore, in this example, the predictive dialer module may apportion a greater number of the available trunks to process the 3% sub-list 230 since this sub-list 230 has the largest amount of telephone numbers.

In another embodiment, the predictive dialer module may consider, in addition to or instead of the amount of telephone numbers making up each sub-list 230, the applicable abandonment rate for each sub-list 230. For example, since the predictive dialer module can likely pace calls quicker for the telephone numbers in the 3% sub-list 230 then for the telephone numbers in the 2% or 1% sub-lists 230, the predictive dialer module may apportion additional trunks to the 2% and 1% sub-lists 230 to help offset the slower pacing the predictive dialer module would have to normally apply for these sub-lists 230. Those of ordinary skill in the art can envision other types of criteria the predictive dialer module may use in apportioning the available trunks among the sub-lists 230.

Continuing on, the predictive dialer module then sets the appropriate abandonment rate for each corresponding trunk group in Operation 925 and begins to process the calls for each of the sub-lists 230 on the corresponding trunk group in Operation 930. Therefore, the predictive dialer module is capable of processing multiple abandonment rates across groups of available trunks.

Accordingly, in various embodiments, the predictive dialer module may periodically monitor all of the trunks to determine whether one or more goals set for the outbound call campaign 210 have been achieved. Therefore, in these particular embodiments, the predictive dialer module may periodically pool the results for trunk groups and combine the results to determine whether the goal(s) set for the campaign 210 have been reached in Operation 935. Once the results have been combined, the predictive dialer module determines whether the goal(s) have been achieved in Operation 940. If not, the predictive dialer module determines whether there are more telephone numbers (e.g., records) to process for one or more of the sub-lists 230 in Operation 945. If so, the predictive dialer module returns to Operation 930 and continues to process the sub-lists 230 on their corresponding trunk groups.

Exemplary Computer Processing Device

Figure 10:
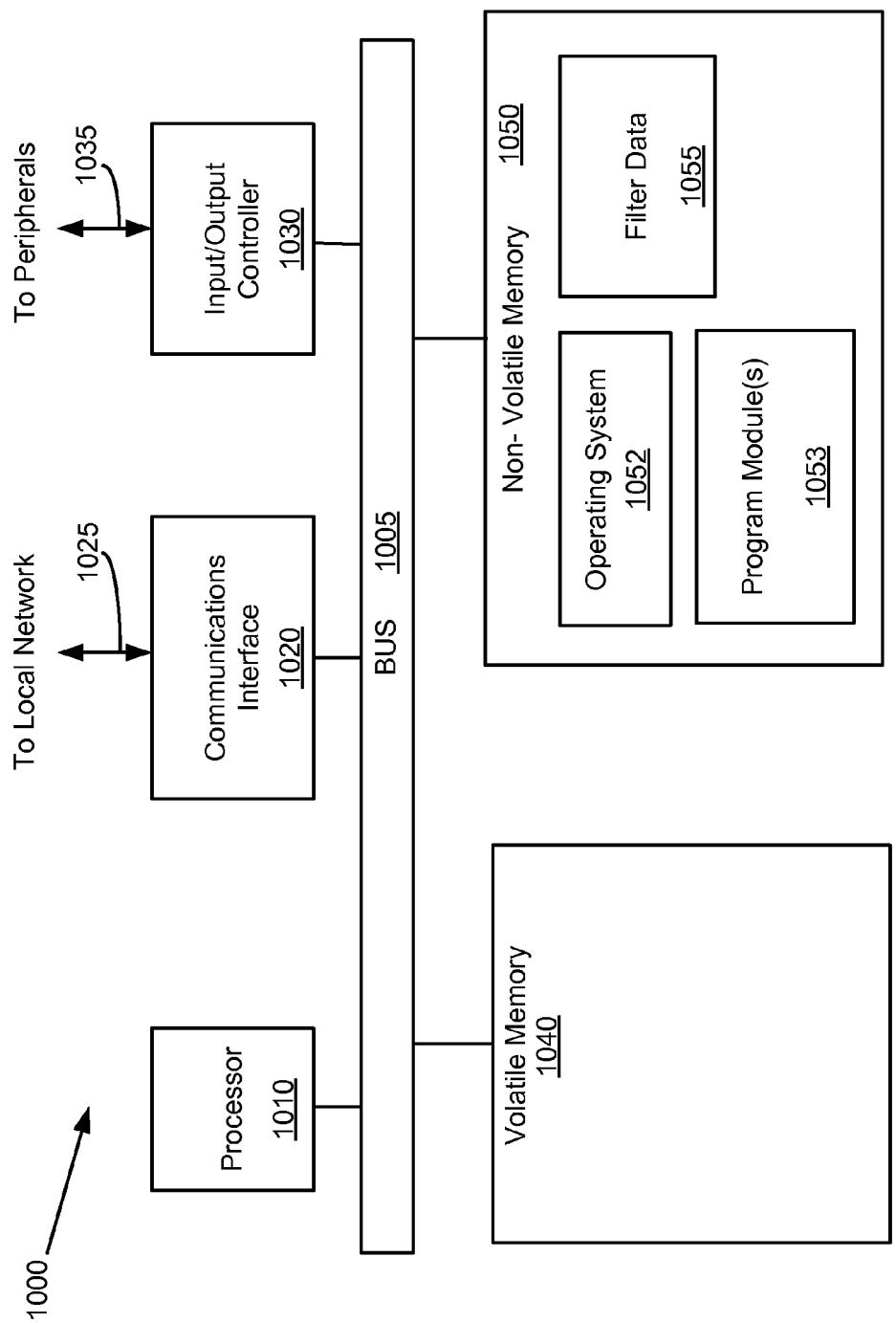
FIG. 10 illustrates one embodiment of a processing device used to practice the technologies disclosed herein.

FIG. 10 is an exemplary schematic diagram of a computer processing system that may be used in an embodiment of the contact center architecture 100 to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1010 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1020 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1030 may also communicate with one or more input devices or peripherals using an interface 1035, such as, but not limited to: a keyboard, a mouse, a touch screen/display input, microphone, pointing device, etc. The input/output controller 1030 may also communicate with output devices or peripherals, such as displays, printers, speakers, headsets, banner displays, etc. These may be used, in part, to receive Administrator input, including for interacting with the manual agent selection module.

The processor 1010 may be configured to execute instructions stored in volatile memory 1040, non-volatile memory 1050, or other forms of computer readable storage media accessible to the processor 1010. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1050 may store program code and data, which also may be loaded into the volatile memory 1040 at execution time. Specifically, the non-volatile memory 750 may store one or more program modules 1053 such as the sub-lists module and/or the predictive dialer module that may perform the above mentioned process flows and/or operating system code 1052 containing instructions for performing the process and/or functions associated with the technologies disclosed herein. The these modules 1053 may also access, generate, or store the various sub-lists 230 and/or sets 245, including the filter data 1055 described above in the non-volatile memory 1050, as well as in the volatile memory 1040. The volatile memory 1040 and/or non-volatile memory 1050 may be used to store other information including, but not limited to: records, applications, programs, scripts, source code, object code, byte code, compiled code, interpreted code, machine code, executable instructions, or the like. These may be executed or processed by, for example, processor 1010. These may form a part of, or may interact with, the program modules 1053.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

Further, it is noted that the concepts and technologies set forth herein may be applied to parameters other than abandonment rates in particular embodiments. For example, particular embodiments of the invention may be applicable in processing call campaigns with respect to other multiple variables that may be defined for a campaign. For example, in collections environments, a contact center may be processing a call list for a particular campaign having telephone numbers with different limits with respect to the number of calls the contact center may attempt to try and contact parties associated with the telephone numbers for debt collection purposes. Thus, in this example, the call list may be apportioned into sub-lists based on the number of allowed attempts for the telephone numbers in each sub-list so that the contact center may process a particular sub-list more or less aggressively based on the applicable allowed attempts for the particular sub-list.

The invention claimed is:

1. A method for conducting an outbound call campaign, the method comprising the steps of:
    accessing a call list for the outbound call campaign, the call list comprising a plurality of telephone numbers;
    applying one or more filters to the call list to identify a first sub-list comprising telephone numbers from the plurality of telephone numbers for which a first target abandonment rate is applicable and a second sub-list comprising telephone numbers from the plurality of telephone numbers for which a second target abandonment rate is applicable, wherein the first target abandonment rate is a compliance abandonment rate set by one or more states, the second target abandonment rate is a Federal Trade Commission compliance abandonment rate, and the first target abandonment rate is different than the second target abandonment rate;
    placing a first group of telephone calls by a predictive dialer, wherein the first group of telephone calls is based on telephone numbers from the first sub-list and the predictive dialer originates the first group of telephone calls to target the first target abandonment rate over a first particular period of time;
    after placing the first group of telephone calls, placing a second group of telephone calls by the predictive dialer, wherein the second group of telephone calls is based on telephone numbers from both the first sub-list and the second sub-list and the predictive dialer originates the second group of telephone calls to (1) continue to target the first target abandonment rate over the first particular period of time when the first target abandonment rate is less than the second target abandonment rate or (2) transition to target the second target abandonment rate over a second particular period of time when the first target abandonment rate is greater than the second target abandonment rate; and
    after placing the second group of telephone calls, placing a third group of telephone calls by the predictive dialer, wherein the third group of telephone calls is based on telephone numbers from the second sub-list and the predictive dialer originates the third group of telephone calls to target the second target abandonment rate over the second particular period of time.

2. The method of claim 1, wherein the first and second particular periods of time comprise at least one of thirty consecutive days and a total period of time over which the outbound call campaign is completed.

3. The method of claim 1 further comprising the steps of after placing the third group of telephone calls:
    placing a fourth group of telephone calls by the predictive dialer, wherein the fourth group of telephone calls is based on telephone numbers from both the second sub-list and the first sub-list and the predictive dialer originates the fourth group of telephone calls to (1) continue to target the second target abandonment rate over the second particular period of time when the second target abandonment rate is less than the first target abandonment rate or (2) transition to target the first target abandonment rate over the first particular period of time when the second target abandonment rate is greater than the first target abandonment rate; and
    after placing the fourth group of telephone calls, placing a fifth group of telephone calls by the predictive dialer, wherein the fifth group of telephone calls is based on telephone numbers from the first sub-list and the predictive dialer originates placing the fifth group of telephone calls to target the first target abandonment rate over the first particular period of time.

4. The method of claim 1, wherein the one or more filters applied to the call list are based on states and the first sub-list comprises telephone numbers for one or more states requiring compliance with the first target abandonment rate over the first particular period of time and the second sub-list comprises telephone numbers for one or more states requiring compliance with the second target abandonment rate over the second particular period of time.

5. The method of claim 1 further comprising the step of applying one or more priority rules to prioritize the first sub-list over the second sub-list, wherein the one or more priority rules are based at least on target abandonment rates.

6. The method of claim 1 further comprising the step of determining whether a campaign goal has been achieved by placing the first group of telephone calls, wherein the third group of telephone calls is placed as a result of the campaign goal not being achieved by placing the first group of telephone calls.

7. The method of claim 1, wherein the first group of telephone calls for the first sub-list and the third group of telephone calls for the second sub-list are based on a probability of making a right party contact for a time of day when the telephone calls are to be placed for the first and third groups.

8. A non-transitory, computer-readable storage medium comprising computer-executable instructions for conducting an outbound call campaign by causing at least one computer processor to:
   access a call list for the outbound call campaign, the call list comprising a plurality of telephone numbers;
   apply one or more filters to the call list to identify a first sub-list comprising telephone numbers from the plurality of telephone numbers for which a first target abandonment rate is applicable and a second sub-list comprising telephone numbers from the plurality of telephone numbers for which a second target abandonment rate is applicable, wherein the first target abandonment rate is a compliance abandonment rate set by one or more states, the second target abandonment rate is a Federal Trade Commission compliance abandonment rate, and the first target abandonment rate is different than the second target abandonment rate;
   place a first group of telephone calls, wherein the first group of telephone calls is based on telephone numbers from the first sub-list and each telephone call in the first group of telephone calls is originated to target the first target abandonment rate over a first particular period of time;
   after placing the first group of telephone calls, place a second group of telephone calls, wherein the second group of telephone calls is based on telephone numbers from both the first sub-list and the second sub-list and each call in the second group of telephone calls is originated to (1) continue to target the first target abandonment rate over the first particular period of time when the first target abandonment rate is less than the second target abandonment rate or (2) transition to target the second target abandonment rate over a second particular period of time when the first target abandonment rate is greater than the second target abandonment rate; and
   after placing the second group of telephone calls, place a third group of telephone calls, wherein the third group of telephone calls is based on telephone numbers from the second sub-list and each telephone call in the third group of telephone calls is originated to target the second target abandonment rate over the second particular period of time.

9. The non-transitory, computer-readable storage medium of claim 8, wherein the first and second particular periods of time comprise at least one of thirty consecutive days and a total period of time over which the outbound call campaign is completed.

10. The non-transitory, computer-readable storage medium of claim 8, wherein the computer-executable instructions are further configured, after placing the third group of telephone calls, to cause the at least one computer processor to:
   place a fourth group of telephone calls, wherein the fourth group of telephone calls is based on telephone numbers from both the second sub-list and the first sub-list and each call in the fourth group of telephone calls is originated to (1) continue to target the second target abandonment rate over the second particular period of time when the second target abandonment rate is less than the first target abandonment rate or (2) transition to target the first target abandonment rate over the first particular period of time when the second target abandonment rate is greater than the first target abandonment rate; and
   after placing the fourth group of telephone calls, place a fifth group of telephone calls, wherein the fifth group of telephone calls is based on telephone numbers from the first sub-list and each telephone call in the fifth group of telephone calls is originated to target the first target abandonment rate over the first particular period of time.

11. The non-transitory, computer-readable storage medium of claim 8, wherein the one or more filters applied to the call list are based on states and the first sub-list comprises telephone numbers for one or more states requiring compliance with the first target abandonment rate over the first particular period of time and the second sub-list comprises telephone numbers for one or more states requiring compliance with the second target abandonment rate over the second particular period of time.

12. The non-transitory, computer-readable storage medium of claim 8, wherein the computer-executable instructions are further configured to cause the at least one computer processor to apply one or more priority rules to prioritize the first sub-list over the second sub-list, and the one or more priority rules are based at least on target abandonment rates.

13. The non-transitory, computer-readable storage medium of claim 8, wherein the computer-executable instructions are further configured to cause the at least one computer processor to determine whether a campaign goal has been achieved by placing the first group of telephone calls, and the third group of telephone calls is placed as a result of the campaign goal not being achieved by placing the first group of telephone calls.

14. The non-transitory, computer-readable storage medium of claim 8, wherein the first group of telephone calls for the first sub-list and the third group of telephone calls for the second sub-list are based on a probability of making a right party contact for a time of day when the telephone calls are to be placed for the first and third groups.

15. A system for conducting an outbound call campaign comprising:
   a predictive dialer configured to:
   access a call list for the outbound call campaign, the call list comprising a plurality of telephone numbers;
   apply one or more filters to the call list to identify a first sub-list comprising telephone numbers from the plurality of telephone numbers for which a first target abandonment rate is applicable and a second sub-list comprising telephone numbers from the plurality of telephone numbers for which a second target abandonment rate is applicable, wherein the first target abandonment rate is a compliance abandonment rate set by one or more states, the second target abandonment rate is a Federal Trade Commission compliance abandonment rate, and the first target abandonment rate is different than the second target abandonment rate;
   place a first group of telephone calls, wherein the first group of telephone calls is based on telephone numbers from the first sub-list and each telephone call in the first group of telephone calls is originated to target the first target abandonment rate over a first particular period of time; and after placing the first group of telephone calls, place a second group of telephone calls, wherein the second group of telephone calls is based on telephone numbers from both the first sub-list and the second sub-list and each call in the second group of telephone calls is originated to (1) continue to target the first target abandonment rate over the first particular period of time when the first target abandonment rate is less than the second target abandonment rate or (2) transition to target the second target abandonment rate over a second particular period of time when the first target abandonment rate is greater than the second target abandonment rate; and after placing the second group of telephone calls, place a third group of telephone calls, wherein the third group of telephone calls is based on telephone numbers from the second sub-list and each telephone call in the third group of telephone calls is originated to target the second target abandonment rate over the second particular period of time.

16. The system of claim 15, wherein the first and second particular periods of time comprise at least one of thirty consecutive days and a total period of time over which the outbound call campaign is completed.

17. The system of claim 15, wherein the predictive dialer is further configured, after placing the third group of telephone calls, to:

place a fourth group of telephone calls, wherein the fourth group of telephone calls is based on telephone numbers from both the second sub-list and the first sub-list and each call in the fourth group of telephone calls is originated to (1) continue to target the second target abandonment rate over the second particular period of time when the second target abandonment rate is less than the first target abandonment rate or (2) transition to target the first target abandonment rate over the first particular period of time when the second target abandonment rate is greater than the first target abandonment rate; and after placing the fourth group of telephone calls, place a fifth group of telephone calls, wherein the fifth group of telephone calls is based on telephone numbers from the first sub-list and each telephone call in the fifth group of telephone calls is originated to target the first target abandonment rate over the first particular period of time.

18. The system of claim 15, wherein the one or more filters applied to the call list are based on states and the first sub-list comprises telephone numbers for one or more states requiring compliance with the first target abandonment rate over the first particular period of time and the second sub-list comprises telephone numbers for one or more states requiring compliance with the second target abandonment rate over the second particular period of time.

19. The system of claim 15, wherein the predictive dialer is further configured to apply one or more priority rules to prioritize the first sub-list over the second sub-list, and the one or more priority rules are based at least on the first target abandonment rate.

20. The system of claim 15, wherein the predictive dialer is further configured to determine whether a campaign goal has been achieved by placing the first group of telephone calls, and the third group of telephone calls is placed as a result of the campaign goal not being achieved by placing the first group of telephone calls.

21. The system of claim 15, wherein the first group of telephone calls for the first sub-list and the third group of telephone calls for the second sub-list are based on a probability of making a right party contact for a time of day when telephone calls are to be placed for the first and third groups.

* * * * *